United States Patent [19]

Bradley et al.

[11] Patent Number: 5,422,860

[45] Date of Patent: * Jun. 6, 1995

[54] CORRELATION SONAR SYSTEM

[75] Inventors: Steven E. Bradley; Francis D. Rowe, both of San Diego, Calif.

[73] Assignee: Rowe, Deines Instruments Incorporated, San Diego, Calif.

[*] Notice: The portion of the term of this patent subsequent to May 24, 2011 has been disclaimed.

[21] Appl. No.: 219,646

[22] Filed: Mar. 28, 1994

Related U.S. Application Data

[62] Division of Ser. No. 966,092, Oct. 23, 1992, Pat. No. 5,315,562.

[51] Int. Cl.6 ............................................. G01S 15/60
[52] U.S. Cl. ..................................................... 367/89
[58] Field of Search ............................ 367/89, 90, 91

[56] References Cited

U.S. PATENT DOCUMENTS

| | | | |
|---|---|---|---|
| 3,147,477 | 9/1964 | Dickey, Jr. | 367/89 |
| 3,778,822 | 12/1973 | Bauer | 367/98 |
| 4,103,302 | 7/1978 | Roeder et al. | 367/89 |
| 4,244,026 | 1/1981 | Dickey, Jr. | 367/89 |
| 5,117,238 | 5/1992 | Silverstein et al. | 342/373 |
| 5,122,990 | 6/1992 | Deines | 367/89 |
| 5,315,562 | 5/1994 | Bradley et al. | 367/89 |

FOREIGN PATENT DOCUMENTS

WO9205456 4/1992 WIPO.

OTHER PUBLICATIONS

"Acoustic bedload velocity estimates using a broadband pulse–pulse time correlation technique", Sutton et al., Journal of the Acoustical Society of America, vol. 92, No. 3, Sep. 1992; pp. 1692–1698.

"A New Wideband Spread Target Maximum Likelihood Estimator for Blood Velocity Estimation—Part II: Evaluation of Estimators with Experimental Data", Ferrara et al, IEEE Transactions on Ultrasonics, Ferroelectric and Frequency Control vol. 38, No. 1, 1 Jan. 1991, New York; pp. 17–26.

"Acoustic Correlator Current Profiler", Bradley et al., Proceedings of the IEEE Fourth Working Conference on Current Measurement, 1 Aug. 1990, Clinton, Md. pp. 306–313.

*Primary Examiner*—Daniel T. Pihulic
*Attorney, Agent, or Firm*—Knobbe, Martens, Olson & Bear

[57] ABSTRACT

In a correlation device, a system and method for measuring velocities using a single coded pulse generator. The correlation device may also include maximum likelihood estimation techniques for processing the echo signals received from a plurality of transducers. The presently preferred embodiment of the device is as a current profiler having a bottom tracking capability for providing vessel velocity.

17 Claims, 13 Drawing Sheets

Microfiche Appendix Included
(146 Microfiche, 3 Pages)

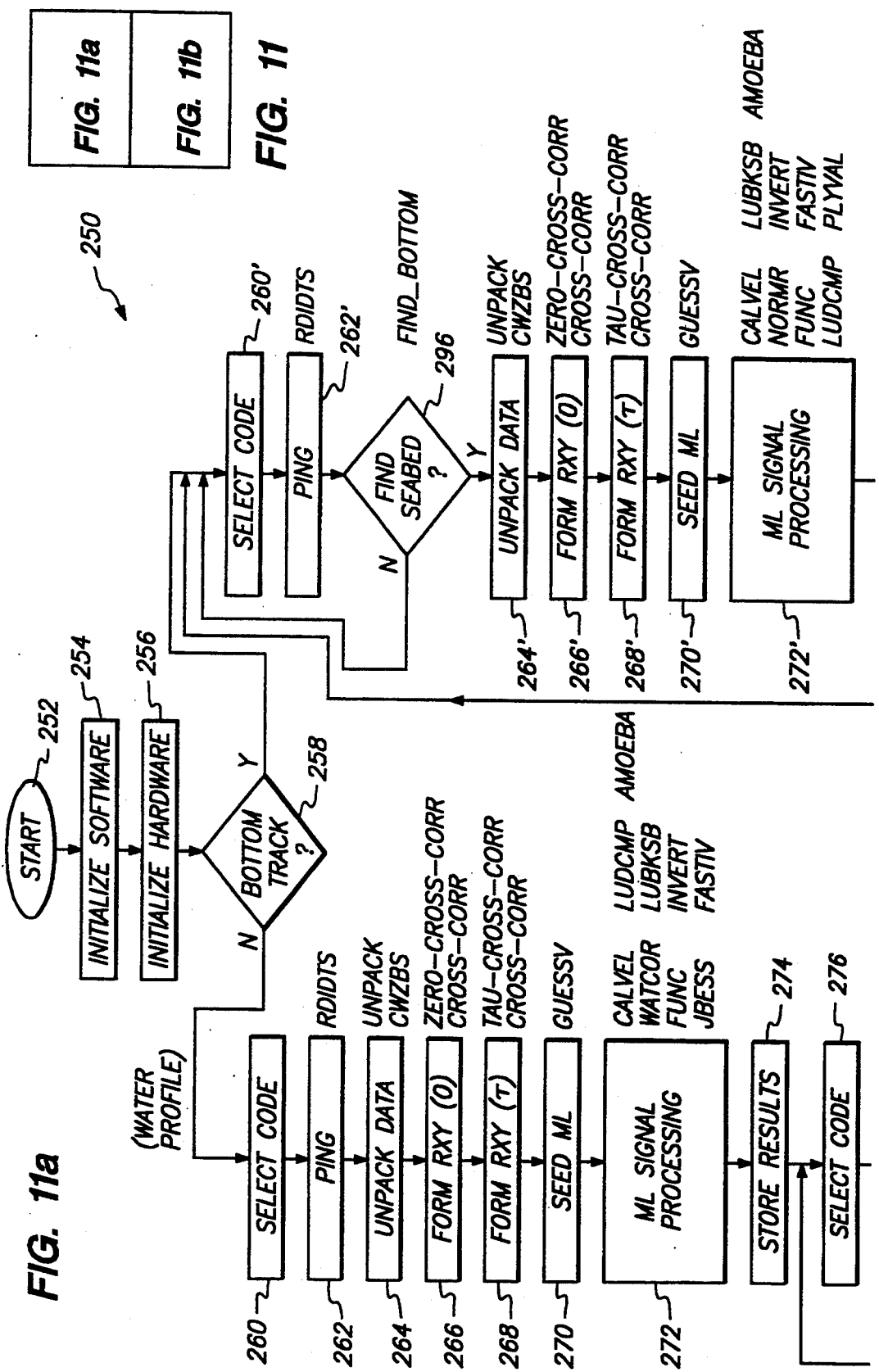

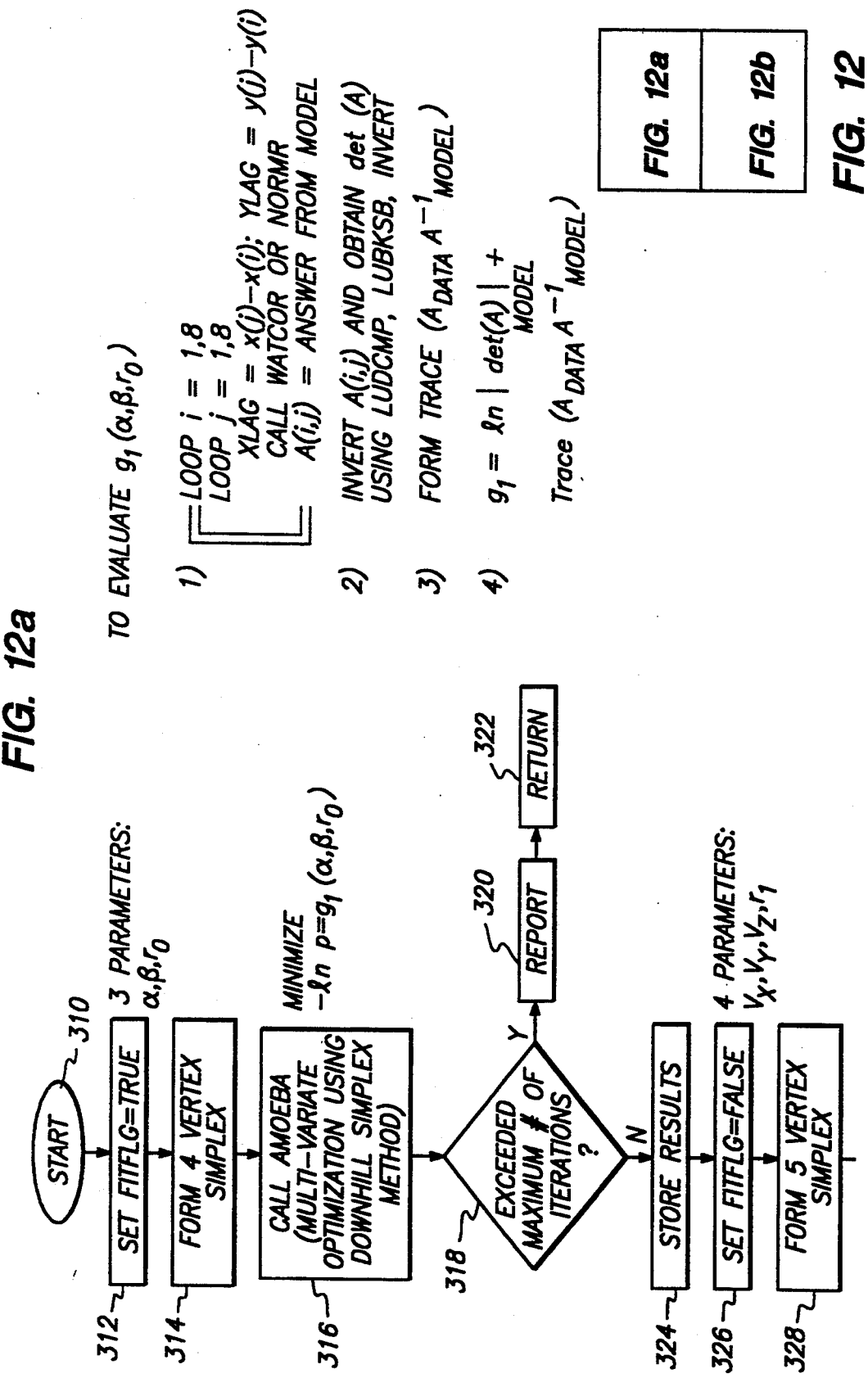

CORRELATION SONAR SYSTEM

This application is a divisional of application Ser. No. 07/966,092, filed Oct. 23, 1992, now U.S. Pat. No. 5,315,562.

A microfiche appendix containing computer source code is attached. The microfiche appendix comprises three (3) sheets of microfiche having 146 frames, including one title frame.

The microfiche appendix contains material which is subject to copyright protection. The copyright owner has no objection to the reproduction of such material, as it appears in the files of the Patent and Trademark Office, but otherwise reserves all copyright rights whatsoever.

BACKGROUND OF THE INVENTION

1. Field of the Invention

The present invention relates to velocity measurement systems and, more particularly, to such systems applying correlation methods.

2. Description of the Related Technology

There is a class of systems that measure distance or velocity with sound waves. These systems include underwater sonar and medical imaging equipment (hereinafter generally referred to as "sonar systems"). Underwater sonar system, in particular, may be manifested as current profilers, velocity logs, and so forth.

A current profiler is a type of sonar system that is used to remotely measure water velocity over varying ranges. Current profilers are used in freshwater environments such as rivers, lakes and estuaries, as well as in saltwater environments such as the ocean, for studying the effects of current velocities. The measurement of accurate current velocities is important in such diverse fields as weather prediction, biological studies of nutrients, environmental studies of Sewage dispersion, and commercial exploration for natural resources, including oil.

Typically, current profilers are used to measure current velocities in a vertical column of water for each depth "cell" of water up to a maximum range, thus producing a "profile" of water velocities. The general profiler system includes a transducer to generate pulses of sound (which when downconverted to human hearing frequencies sound like "pings") that backscatter as echoes from plankton, small particles, and small-scale inhomogeneities in the water.

Two important types of sonar technology that may be used for current profiling are Doppler and correlation. The basic concept of velocity measurement using signal correlation has been known for many years. For example, in 1964, Dickey, Jr. was issued U.S. Pat. No. 3,147,477 ("Dickey '477") disclosing a system to measure speed including a source of wave energy (or transmitted signal) directed toward a body, multiple receiving devices having a known separation for receiving echoes from the body, correlating means including time delay means, and speed determining means dependent on the quotient of the receiver separation and the time delay. Although the patent document describes an embodiment correlation system for an aircraft using radar (electromagnetic signals), it suggests a correlation system for a water-going vessel using sonar (sound signals).

A correlation system inherently requires that the transmitted signal must have some similarity with itself to achieve a maximum correlation at the specified time delay. A correlation system was disclosed by Roeder, et al. (U.S. Pat. No. 4,103,302) wherein signal similarity was achieved by generating a pulse train, or series of repeating pulses. According to the disclosure, the use of repeating pulses provides advantages over the continuous wave (CW) system described in Dickey '477 including: a simplified transmission source, insensitivity to variations in attitude of the conveying vehicle, and improved accuracy and reliability derived from digital electronics.

U.S. Pat. No. 4,244,026 to Dickey, Jr., ("Dickey '026") hereby incorporated by reference, discusses a correlation system using a pulse train from which complex correlation values are employed in velocity measurement. According to Dickey '026, the method of signal processing the complex correlation values estimates components of location by specifically requiring the steps of processing the correlation values as samples of a continuous function of position and curve fitting the samples to the magnitude or real part of the continuous, spacial correlation function to provide an estimate of the peak value of correlation magnitude. Thereafter, the location components at the correlation peak are divided by twice the pulse repetition period of the pulse train to obtain velocity measurements. This signal processing is described in the specification of Dickey '026 at col. 13, lines 7-40.

As previously noted, correlation sonar technology can be used in current profilers. In designing a current profiler, in particular, trade-offs are made among a variety of factors, including maximum profiling range and temporal spacial (the size of the depth cell), and velocity resolution. Temporal resolution refers to the time required to achieve a velocity estimate with the required degree of accuracy. In typical applications, a current profiler will make a series of measurements which are then averaged together to produce a single velocity estimate with an acceptable level of velocity variance, or squared error.

Over the past ten years, acoustic Doppler technology has been successfully developed for short- and medium-range current profiling applications such as measuring sediment movement in rivers and estuaries. To achieve the longer ranges necessary to study water velocities at deep ocean depths, lower frequencies must be used so that energy losses due to sound absorption by the water can be kept at manageable levels. Although there is no fundamental limitation in the Doppler technology that prevents the use of lower frequencies, there is a practical constraint due to the large size of the acoustic transducers required for these lower frequencies. Existing correlation sonar techniques measure current velocities by transmitting two short pulses from a relatively smaller transducer along a correspondingly wider angle acoustic beam. By careful cross-correlation of spatially sampled returns it is possible to determine the displacement of the acoustic targets within the beam from one pulse to the next, and hence, compute their average velocity. The primary advantage of a correlation sonar is that for comparable sized systems, the correlation sonar is able to utilize a lower frequency regime and, therefore, potentially gains substantial current profiling range.

Nonetheless, it is only recently that the computational burden required of sophisticated signal processing methods, required for accurate correlation processing, has been made feasible by advances in the semiconductor and computer architecture fields. The improved signal processing should include a means for bottom tracking so that the correlation sonar can also serve as a navigation device. It would also be desirable to allow individual users the flexibility of selectably trading off standard deviation and profiling resolution so as to maximize range.

SUMMARY OF THE INVENTION

The above-mentioned needs are satisfied by the present invention which includes a correlation sonar system utilizing a monopulse transmission method and a maximum likelihood method of signal processing.

In the presently proposed embodiment of the invention, the correlation system performs the functions of a current profiler, which measures current velocities in a water column, and a bottom tracker, which measures vessel velocity relative to the bottom of a body of water, such as the ocean. Basically, the present inventive system begins making velocity measurements by transmitting a single, uninterrupted acoustic pulse into the water. This pulse is of a long duration so as to not only provide a correlation delay that is less than the pulse width, but also so as to typically simultaneously ensonify all of the "scatterers" on the bottom.

The single pulse is typically transmitted for a sufficient duration to encompass both the range of temporal delays to all scatterers in the water column cell (and the bottom) as well as the temporal delay for correlation processing. The single pulse may be coded, using phase encoding, for example, fort he purpose of reducing the noise variance on the measured velocity.

These fields of scatterers in the water column and on the bottom together form a plurality of acoustically reflective surfaces.

The pulse echoes produced when the pulse encounters small-scale inhomogeneities in the water, and then the bottom, are received by a set of transducers. The pulse echoes received by the transducers are represented internally to the system as complex values. These complex values are cross-correlated at different time lags (typically zero and tau) to form complex correlation values.

The complex correlation values are not converted to correlation magnitudes but rather the complex correlation values, which retain explicit phase information, are used to form a probability function. Hypothesized parameters, such as signal-to-noise ratio, seabed slope angles, parameters characterizing seabed roughness, and three component velocity ($v_x$, $v_y$, $v_z$), are combined with the complex correlation values to obtain a probability. The combining of hypothesized parameters and complex correlation values into a probability is accomplished mathematically using a conditional probability density function (for example, see equation 6.15 on p. 70 of *Statistical Theory of Signal Detection*, Carl Helstrom, Pergamon Press, 1968). Hypothesized parameters are then adjusted by a model to maximize the probability. This method is appropriately known as the maximum likelihood method.

Typically, the complex values are correlated at zero lag and at the autocorrelation lag where there is a peak in the autocorrelation of the pulse and, in addition, there may be some utility in correlating at other lags as well. Consequently, a set of transmission code sequences may be stored so that one among the set may be selected based on altitude or cell resolution requirements and pursuant to an autocorrelation lag that may be the most appropriate to use for a given range of speeds.

These and other objects and features of the present invention will become more fully apparent from the following description and appended claims taken in conjunction with the accompanying drawings.

BRIEF DESCRIPTION OF THE DRAWINGS

FIG. 9b is a top plan view of the mechanical assembly for the correlation sonar system shown in FIG. 9a;

FIGS. 11a and 11b are a flow diagram of the computer software for the correlation sonar system as executed in the electronics assembly shown in FIG. 10; and FIGS. 12a and 12b are a flow diagram of the computer software for the maximum likelihood function shown in FIG. 11.

DETAILED DESCRIPTION OF THE PREFERRED EMBODIMENTS

Reference is now made to the drawings wherein like numerals refer to like parts throughout. The following Detailed Description is organized into sections I–V. Section I discusses alternative pulse generation techniques that may be used in the present invention. Section II presents the presently preferred correlation sonar hardware. Section III reviews maximum likelihood estimation principles. Section IV discusses several methods to calculate the model correlation matrix as a function of unknown parameters. Section V describes the operation of the presently preferred correlation sonar. The following discussion particularly describes one presently preferred correlation sonar; however, it will be understood that the present invention includes other types of correlation systems as well.

I. PULSE GENERATION DISCUSSION

Figure 1:
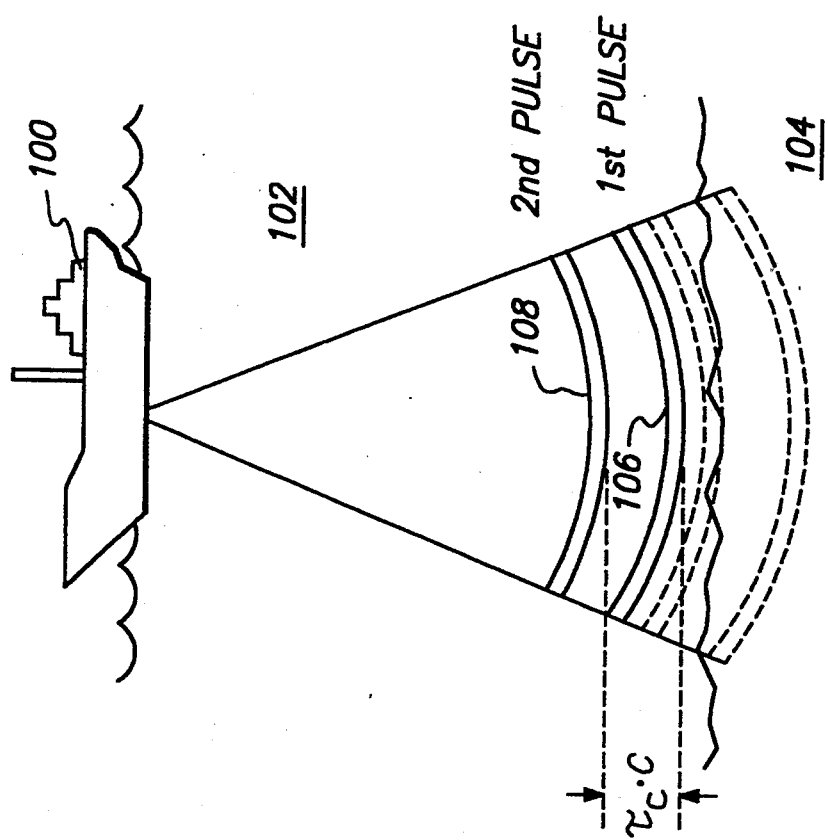
FIG. 1 is a schematic representation of a water-going vessel utilizing means for generating multiple pulse sound energy into the water.

FIG. 1 is an idealized correlation sonar scenario showing a water-going vessel 100 afloat in a body of water 102 having a bottom 104. The vessel 100 employs a multiple pulse, correlation, sonar system (not shown), having two receivers, to track the bottom 104 and determine vessel velocity. The system transmits a first narrow pulse 106, to identify a small range spread of scatterers on the bottom 104, and then repeats to generate a second narrow pulse 108 to achieve the desired correlation in the transmitted signal at a predetermined processing delay. The two pulses 106, 108 maintain a distance relationship of $\tau_c$, the pulse repetition interval, times the speed of sound in water, C.

Figure 2:
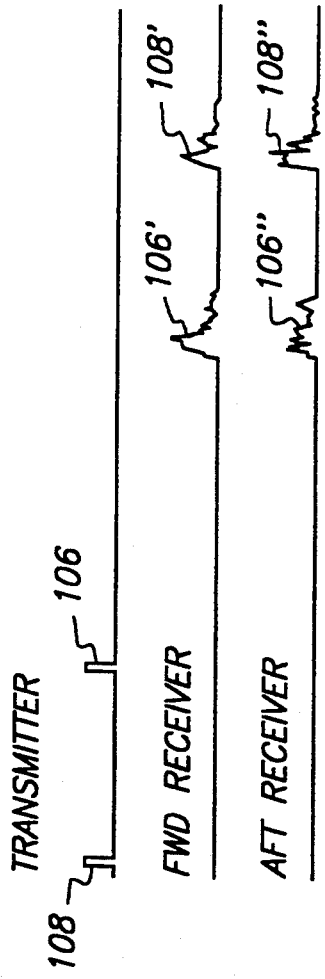
FIG. 2 is a simplified waveform diagram corresponding to the method of sound transmission shown in FIG. 1.

For instance, FIG. 2 demonstrates the concept of a repeated pulse transmission wherein, at two receiver locations on the forward ("fwd") and aft portions of the vessel 100 (FIG. 1), a pulse echo pair 106' and 108", corresponding respectively to the first and second pulses 106, 108, will be highly correlated when the ship is moving forward with velocity approximately equal to the distance of separation between the two receivers divided by twice the time interval between the two transmitted pulses. Note on the top line of FIG. 2, time increases to the left (i.e., pulse 108 is generated after pulse 106); whereas in lines two and three, time increases to the right (i.e., reception of 108' and 108" occur after reception of 106' and 106", respectively).

The resolution of the differential range to the bottom scatterers 104 which can be simultaneously illuminated is limited by the width of the pulses 106,108 (FIG. 1). This causes the initial portion of the return echo 106' (and 106") to come from a center point on the bottom 104 below the sonar system first and then later portions of return echo 106" (and 106") comes from scatterers on the bottom 104 that are offset from the point and thus at a greater range from the system than the center point. After a period of time, the system views the scatterers that are beyond the transmitter beamwidth and the signal level fades away as indicated by the ramped shape of the, final portion of the received echo 106' (and 106") in FIG. 2. At a later time, a second pulse 108 hits the bottom 104 and the scenario repeats.

Because the received signal level attenuates over time, or in other words, the leading portion of the echo is substantially different from the trailing portion, the correlation delay of the multiple pulse system (i.e., the time between pulses, $\tau_c$) should be equal to or longer than the bottom illumination time (i.e., the pulse width). If it were otherwise, the system would estimate velocity at significantly reduced precision caused by interpulse interference.

Figure 3:
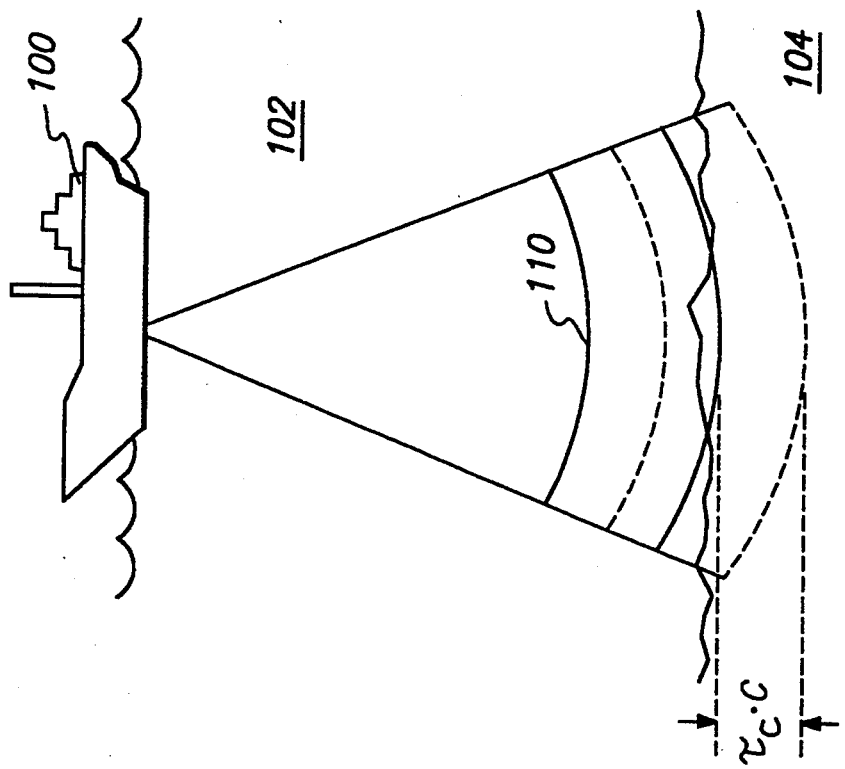
FIG. 3 is a schematic representation of a water-going vessel utilizing means for generating monopulse sound energy into the water.
Figure 4:
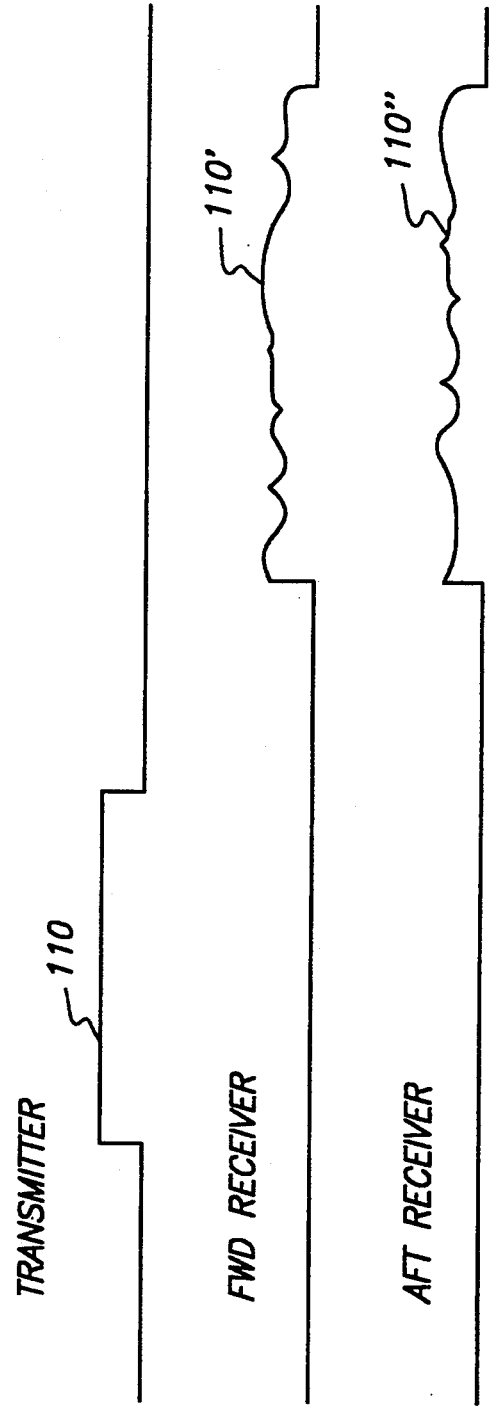
FIG. 4 is a simplified waveform diagram corresponding to the method of sound transmission shown in FIG. 3.

The timing of the preferred single pulse, or monopulse, transmission of the present invention is quite different from the multiple pulse system. FIG. 3 shows a scenario similar to FIG. 1; however, in FIG. 3 the vessel 100 employs a monopulse correlation system. A simplified pulse waveform of the presently preferred system is shown in FIG. 4. The width of a single transmitted pulse 110 is typically long compared to the range spread to the scatterers on the bottom 104 (FIG. 3) The single return echo 110', 110" received by the forward and aft receivers corresponds roughly in length to the transmitted pulse 110 and, hence, the scatterers on the bottom 104, inside the beamwidth, are typically all viewed simultaneously.

In general, the single pulse is coded, e.g., phase coding, to have a pre-specified autocorrelation peak. The modulation, or coding, on the return echo 110" of the aft receiver is shifted in time, or delayed, compared to the echo 110' received by the forward ("fwd") receiver. This time shift is indicative of the period of time that the vessel 100 traverses a distance equal to one-half the distance between the receivers. Therefore, the correlation delay of the presently preferred system must always be less than the width of the single pulse which is to be contrasted with the multiple pulse technique that is typically greater than or equal to the pulse width.

Figure 5:
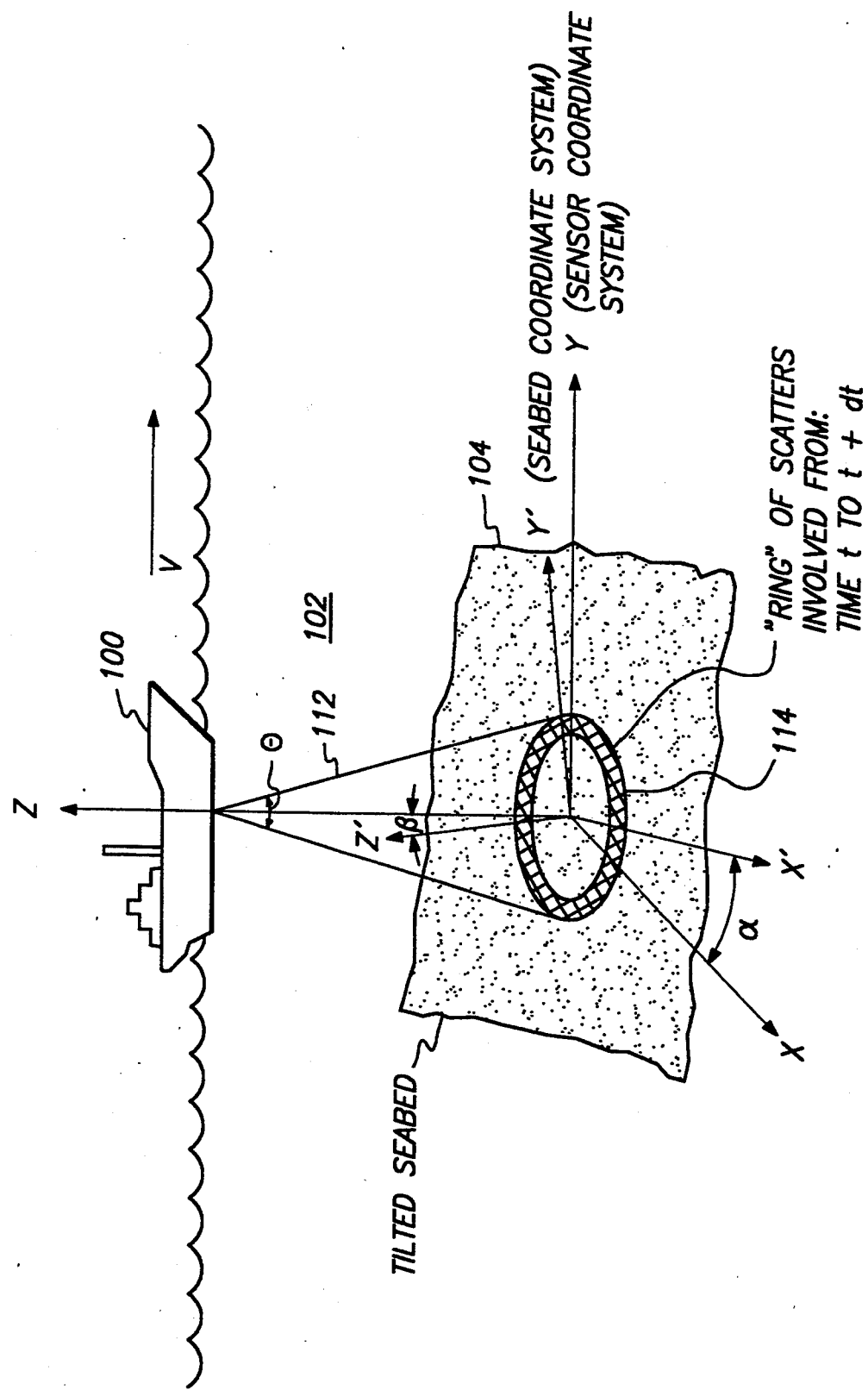
FIG. 5 is a schematic representation of a typical correlation sonar scenario wherein a water volume, followed by a seabed, is ensonified by a pulse having a temporal autocorrelation peak at a time lag of $\tau_c$.

FIG. 5 shows a typical correlation sonar scenario. The water volume in a beam 112 and the seabed 104, which has an "effective" tilt as measured by angles $\alpha$ and $\beta$, is ensonified by a coded pulse created by a relatively wide beam acoustic transducer (not shown) of width $\Theta$ and center frequency $f_0$. The nature of a single, coded pulse is such that the autocorrelation function of the pulse possesses a temporal autocorrelation peak at a predetermined time lag of $\tau_c$. The returning pressure waves are monitored in time at differing spatial locations. Note that at a given instant in time, only scattering centers which reside within a series of ring-like structures, e.g., 114 on the seabed 104 are received. As time increases, the radius of these rings will increase. The signal return from one receiver at a time, t, will be highly correlated with the return from another receiver at a time $t + \tau_c$ provided that the scatters have moved exactly one-half the spatial vector difference between the two receivers in a time $\tau_c$.

This effect is referred to as "waveform invariance". Equivalently, "waveform invariance" implies that the time domain return from a series of stationary scatterers depends not on the exact location of the transmitter and receiver, but rather only on the midpoint of the line segment which joins the transmitter and receiver. The principle of waveform invariant geometry assumes only that the vertical distance to the scatterers is large compared to the transducer element separation. For the correlation sonar, the transducer separations are typically of the same order of magnitude as the wavelength of sound, and therefore this approximation applies in almost every conceivable case. Another interesting feature of waveform invariance is the complete lack of any dependence of the horizontal velocity on the speed of sound in the water.

The signals received by two different transducers can be cross-correlated with a time lag, $\tau_c$, corresponding to the autocorrelation peak of the transmitted pulse. By utilizing a variety of receiver transducers which have different mutual spatial separation vectors, it is possible to search for the vector displacement corresponding to the maximum of the correlation function.

The real situation for the correlation sonar is more complicated. Roughly, the location of the maximum of the amplitude of the correlation function contains information about the "horizontal" velocity, while the corresponding phase of the correlation function contains information about the "vertical" velocity. However, the maximum likelihood signal processing algorithm used by the present invention estimates the velocity through a means which does not seek to locate the peak of the magnitude of the correlation function nor determine phase under the peak, but rather incorporates all available correlations in their full complex form to determine the most likely velocity vector. Additional complications must be addressed concerning signal-to-noise ratio (SNR) values and possible sensor pitch and roll changes between transmit and receive. For example, the angles $\alpha$ and $\beta$ are related to an "effective" seabed tilt and/or transducer tilt due to vessel movement. The angles $\alpha$ and $\beta$ also contain information regarding the beam patterns of the transmitter and receivers as well as the angular scattering strength of the seabed. These additional complications tend to slightly modify the $\alpha$ and $\beta$ angles to "effective" $\alpha$ and $\beta$ angles which are slightly different from the physical angles which geometrically relate the sensor coordinate system to the seabed coordinate system. Hence, one key to a successful correlation sonar Velocity log function of the present invention is in the, optimal estimation of the unknown three-axis velocity vector from the different complex cross-correlation functions formed from the data collected by the numerous receivers.

Figure 6:
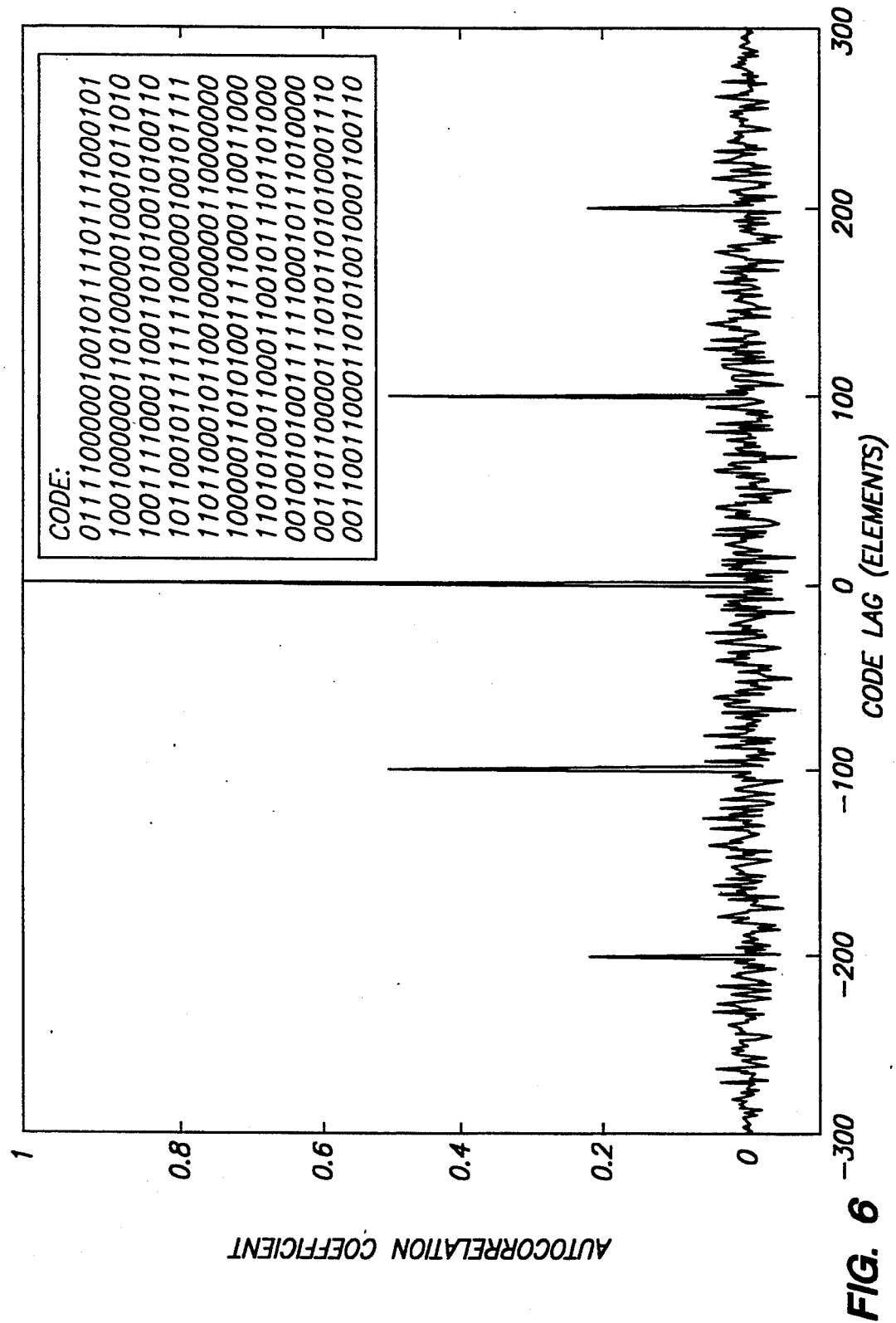
FIG. 6 is a plot of the autocorrelation function of one preferred 300 element coded pulse of the present invention wherein the X-axis is defined as code lag in elements and the Y-axis is defined as a unitless autocorrelation coefficient.

Referring now to FIG. 6, the use of a coded pulse in the presently preferred correlation system provides autocorrelation properties that allows code subsections to be similar but not necessarily identical. Moreover, such encoding is not used to achieve improved spatial resolution (it is used to improve noise averaging) and thus the waveform is not encoded so as to achieve the same function as a repetitive pulse. In fact, non-identical code sections are sometimes deliberately constructed to provide zeroes on either side of the desired autocorrelation peak lag which reduce the corruption of velocity estimates which may be caused by autocorrelation side-lobe biases.

Pulse coding techniques are capable of placing more energy into the water to be available for scattering while maintaining the necessary correlation properties at a time lag $\tau_c$. It is possible to take advantage of this technique to increase the energy content of the pulse packet while maintaining the high bandwidth of the system. Placing more energy per ping into the water is essential to increase the range performance of the present correlation sonar system.

FIG. 6 shows one preferred encoded pulse. The primary pulse coding technique presently used involves pseudo-random codes which are now generated by a code finding program. The length of the code is specified along with the desired time delay for correlation. The computer program, run off-line from the sonar system, then searches for the optimal coded pulse sequence. The program performs many optimization searches and keeps track of the best result. The corresponding solution is then written to disk. The presently preferred modulation method is a two phase encoding scheme. The carrier phase is modulated to be either 0 or 180 degrees for each element. FIG. 6 shows an example 300 element pulse code sequence which results in an autocorrelation side-lobe peak at a 101 element delay. Preferably, each pulse element represents more than two and less than ten carrier cycles.

The presently preferred code finding process is described as follows. First, a random code is generated using well-known methods. The autocorrelation function for the initial random code is calculated. A figure of merit based on the autocorrelation function is then calculated. The figure of merit is related to the sum of squares of all heights divided by the square of the height at desired peak or time delay for correlation. The best values for merit are low, and generally near 1.

Multiple trials are conducted, wherein each trial begins with a new random code. Within each trial, the code may be mutated and a new figure of merit, based on the mutated code, is compared with the best figure of merit for that trial. If the code is found to be better than the best for that trial, the code elements are mutated at a slow rate, usually one at a time, and a more careful search is conducted around the vicinity of the code. If no improvement is found, the number of code elements mutated is slowly increased until a predetermined number of code elements is reached. Anytime a new trial champion is found, the process slows down to mutating one element to search the neighborhood better. After a prespecified number of mutations, the champion from the current random code is saved, and the procedure begins all over again by generating a new random code.

Once a best code is found in each randomly seeded trial, it is possible to attempt to tack on some code elements at the end which will force lags on either side of the desired peak to be zero. Sometimes this procedure has no solution and the code is thrown away. If it is possible, the code elements are appended to the best code and the figure of merit for the newly formed code is compared with the existing overall champion from all trials and, if it is superior, it is saved as the new overall reigning champion.

The details of the presently preferred code finding algorithm are included in the attached Microfiche Appendix.

Figure 7:
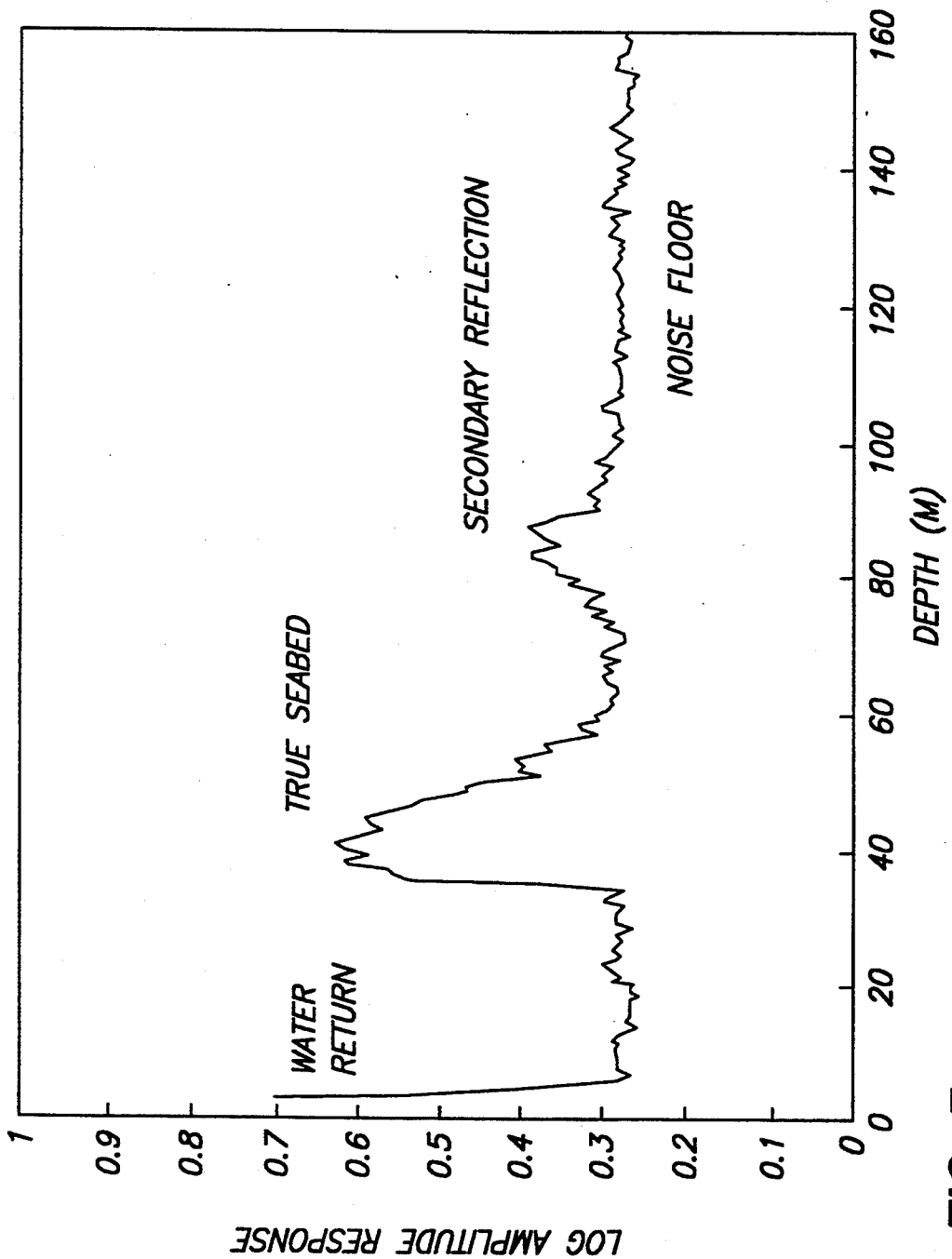
FIG. 7 is an example plot of the log amplitude response of an echo at various depths indicating the difference between the true seabed reflection and secondary reflections that are distinguished by a bottom tracking portion of the present invention.

FIG. 7 illustrates an exemplary echo signal from a sonar system in water having the seabed 104 (FIG. 5) at a depth of 34 meters. Subsequent to the transmission of a coded pulse, each receiver of the correlation sonar system records echo data. Before any correlations or velocity estimation can occur, the data must be searched to determine the distance to the seabed, and hence, the portion of the data to process. The seabed is detected by investigating the amplitude of the response as a function of time. In general, the return from the water volume will decrease from spherical spreading and absorption losses. At some point, the pulse will be reflected from the seabed, resulting in a large increase in backscattered strength.

A matched filter approach is used to determine the bottom range from the reflected signal. The presently preferred matched filter method is a modified version of that described in U.S. Pat. No. 5,122,990 to Deines, et al., which is hereby incorporated by reference.

The example field data of FIG. 7 plots the logarithm of the amplitude of the received signal as a function of apparent depth derived by multiplying ½ the speed of sound by time. The water return quickly diminishes at the beginning of the data stream due in this case to the use of an operational frequency of 76.8 kHz and the cleanliness of the water. At a range of approximately 34 meters, the seabed reflection starts. There is a second "bump" at twice the apparent distance which corresponds to a secondary reflection of the initial transmitted pulse down to the seabed, back up to the water-air interface, down to the seabed again where it is reflected back to the receiver. Depending on the transmitted power, absorption, and depth of the seabed, tertiary and higher order multiple reflections can occasionally be observed. The width of the return is a function of the length of the transmitted pulse and the range to the seabed. Due to thermal noise, ambient noise in the water, and flow noise, the receivers always produce a finite signal corresponding to a noise floor.

II. CORRELATION SONAR HARDWARE DESCRIPTION

Figure 8B:
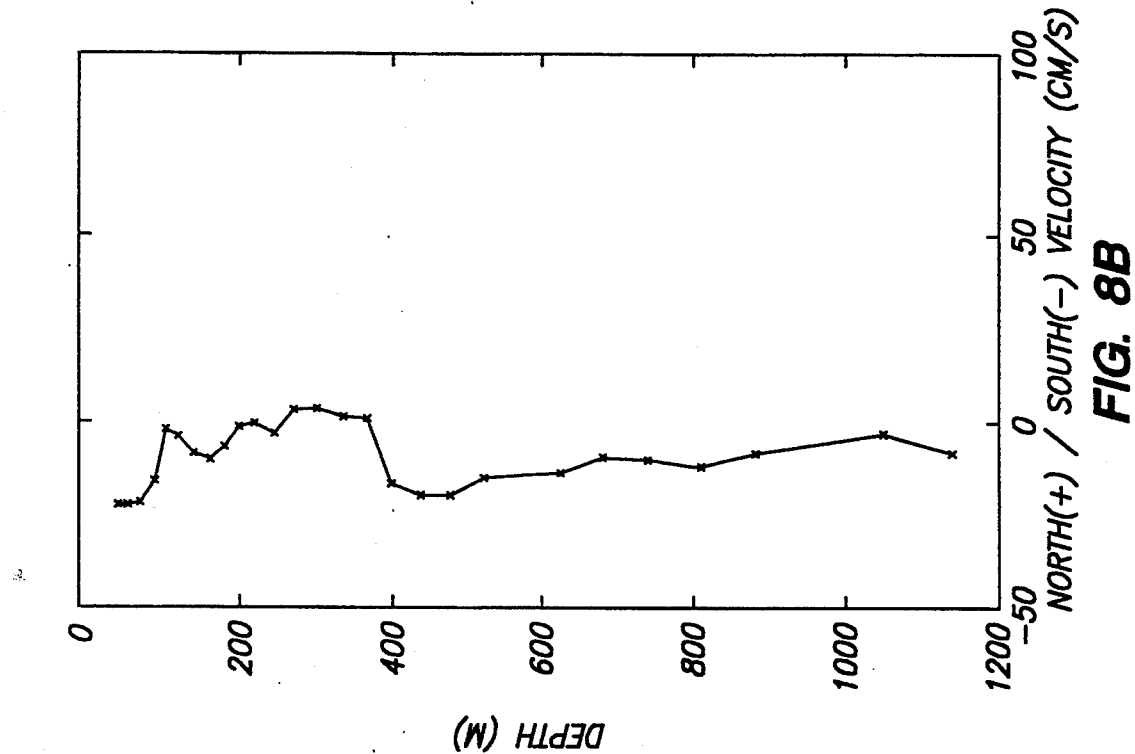
FIG. 8b is a scatter diagram of an exemplary current profile produced by a preferred correlation sonar embodiment of the present invention showing the North/South profile plotted as a function of depth.
Figure 8A:
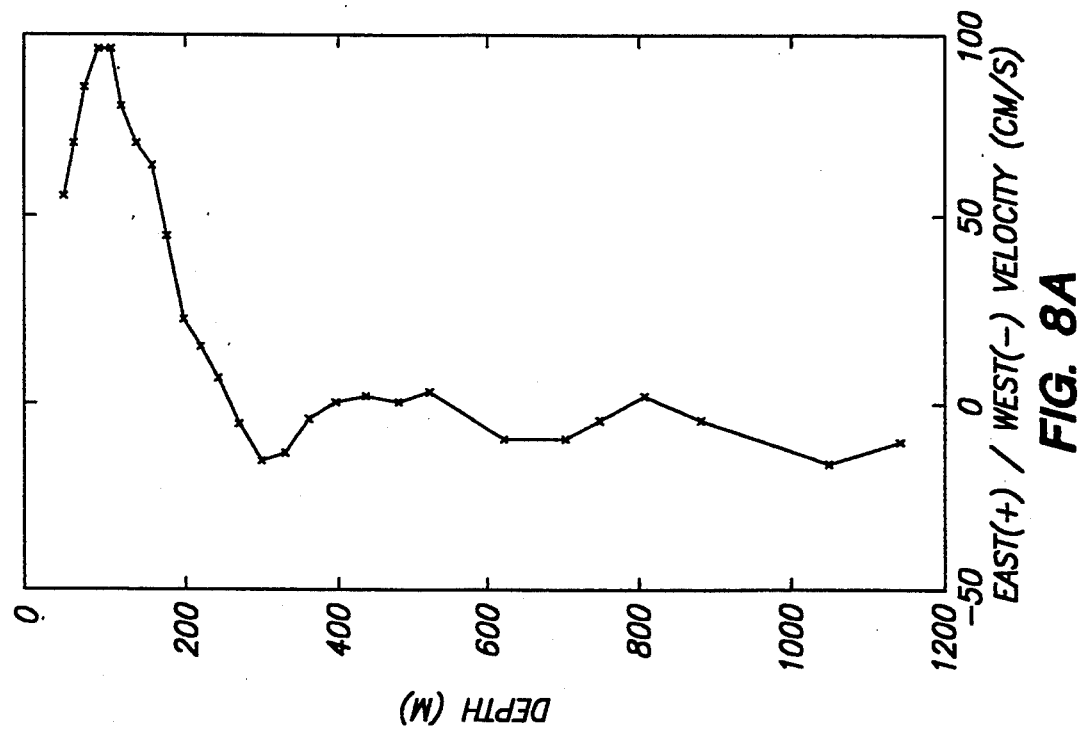
FIG. 8a is a scatter diagram of an exemplary current profile produced by a preferred correlation sonar embodiment of the present invention showing the East/West profile plotted as a function of depth.
Figure 8C:
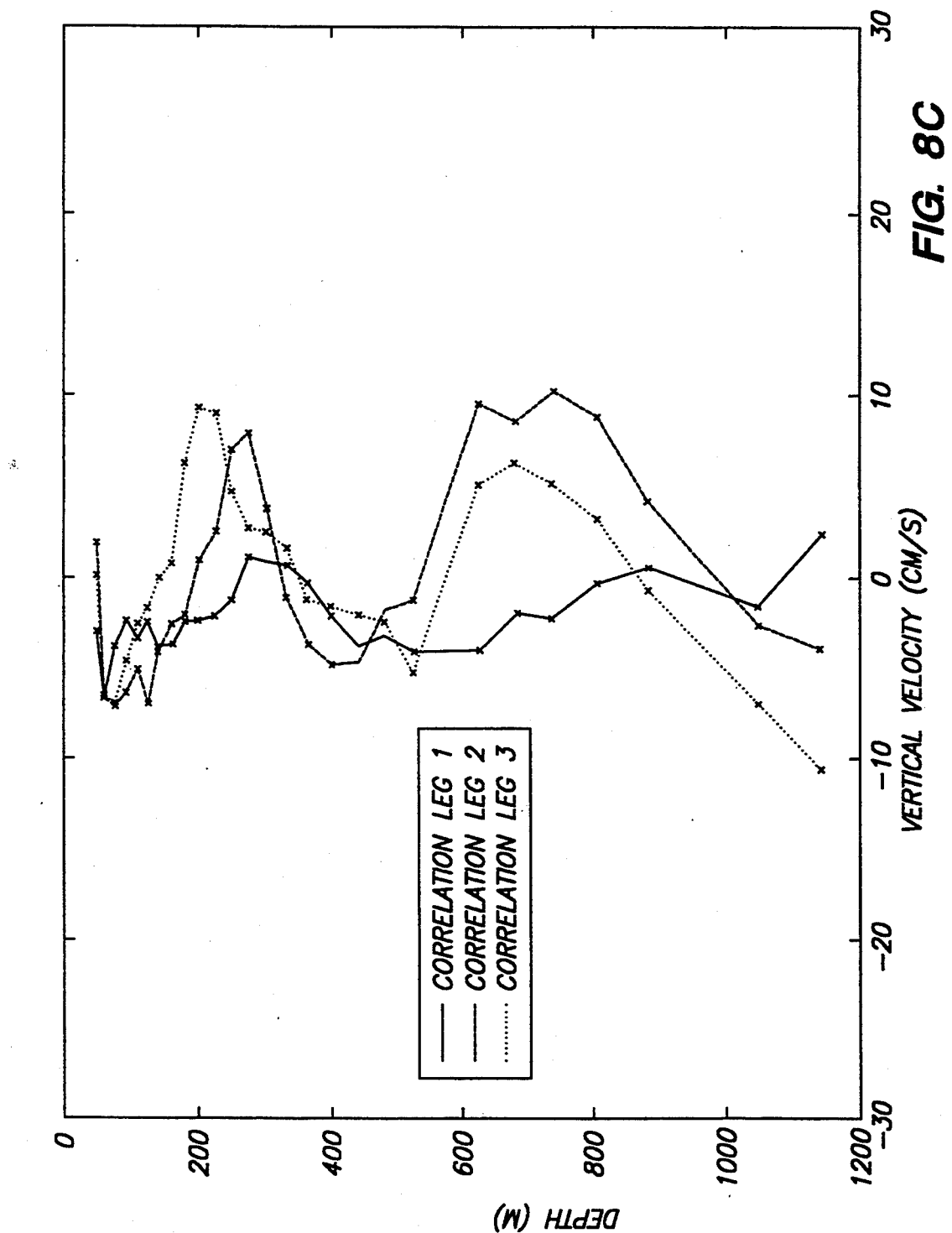
FIG. 8c is a scatter diagram of an exemplary current profile produced by a preferred correlation sonar embodiment of the present invention showing the vertical profile plotted as a function of depth.

As previously noted, the present invention may be embodied as a correlation sonar system having current profiling and bottom tracking functions. FIGS. 8a, 8b and 8c show velocity measurements in a water profile according to a preferred current profiling function of the present invention. FIG. 9a shows a side elevational view of the mechanical assembly, generally indicated at 202, that houses and protects the transducer electromechanicals used to implement the presently preferred correlation sonar of the invention. An I/O connector (not shown) is located at the back end of the transducer assembly 202 so that data can be transferred to the two other subsystems of the correlation sonar system 200 (FIG. 10) via a transmission cable 220.

Figure 9B:
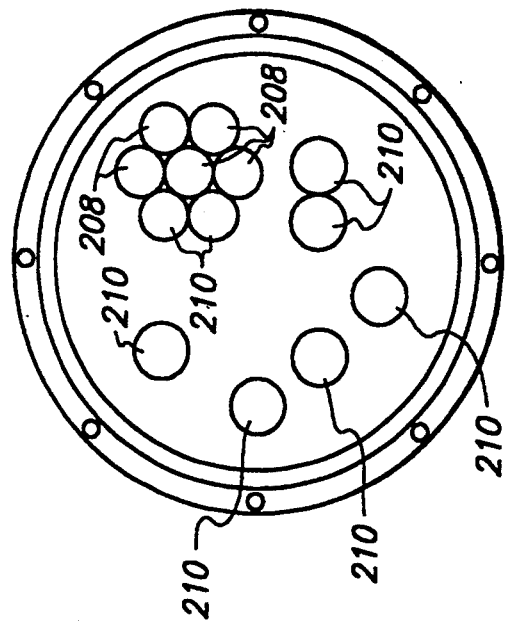
Figure 9A:
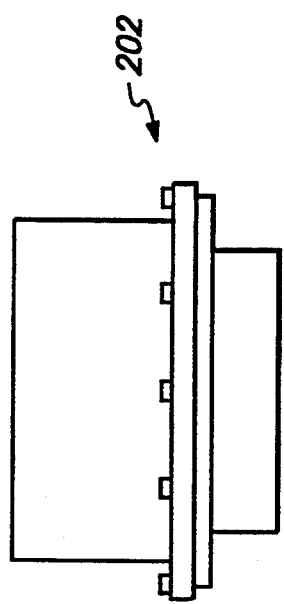
FIG. 9a is a side elevational view of one preferred mechanical assembly for a correlation sonar embodiment of the present invention.

A top plan view of the front end of the transducer assembly 202 is shown in FIG. 9b. The embodiment of the assembly 202 shown has an operational frequency of 22 kHz. However, the transducer assembly 202 is designed to be a modular unit so that other frequencies may be specified using different assembly housings according to the various sized transducers used as dictated by the selected frequency. Seven transducer elements are packed together in a hexagonal configuration (one transducer in the center of the hexagon). All seven of the hex packed elements (five labeled 208 and two labeled 210) are used as transmitter transducers. Two of the hex packed elements 210 and six other separate elements, arranged in the assembly according to an optimization of vector differences between transducers, are used as receiver transducers 210. Each transducer element 208, 210 is approximately 2" in diameter. Other numbers, sizes, spatial separations, and transmitter/receiver assignments of transducers could, of course, be configured.

The illustrated transducer assembly 202 is approximately 18" in diameter and 11" long having a weight of under 150 lbs. and a current profiling range, (with bin resolution somewhat less than a Doppler system), of around 1,200 meters, about twice the depth of a conventional 75 kHz Doppler system. By Comparison, the bottom tracking range of one 75 kHz Doppler system weighing about 350 lbs. and having a length of about 1 meter, is around 1,500 meters. However, the bottom tracking range of the presently preferred 22 kHz system is 5,000 meters or 16,000 feet.

A functional block diagram of the preferred correlation sonar system 200 includes the transducer assembly 202 shown in FIG. 9 and an electronics assembly 204 coupled to a host computer 214. Other designs may incorporate a microprocessor based system inside the electronics assembly 204 to eliminate the need for the separate host computer 214. In general, the correlation sonar system is conveyed on a vessel, such as the vessel 100 shown in FIG. 5; however, underwater vehicles or fixed mountings, such as platform or buoy mountings, are also possible.

The transducer assembly 202 comprises the transducing elements 208,210 which convert electrical energy into acoustic energy for transmitting code sequences, and convert received acoustic energy into electrical energy for analysis. The assembly 202 further comprises a set of tuners 216 to tune the transducing elements to operate at the proper operational frequency and impedance, and, for the receiving transducer elements, a set of receivers 218 to amplify the received signal to the appropriate level for transmission to the electronics assembly 204 through an underwater cable 220, currently a 19 mm multiply shielded cable, connected to the I/O connector (not shown) of the transducer assembly 202.

The electronics assembly 204 includes a set of four demodulator boards 222, wherein each board 222 has sine and cosine channels for two of the receiving transducers 210. The demodulator bards 222 convert the received signal into baseband (low frequency) digital sequences, thus incorporating analog-to-digital (A/D) circuitry. Presently, the complex data is hardlimited and each sample is one of four binary states contained in two bits, one bit per quadrature Component of the waveform. The time interval between samples depends on the sampling rate. The sampling rate is user selectable and is normally chosen to be some factor times the bandwidth of the transducer elements considered. Typically, the sampling rate is 2 to 8 times the bandwidth. For example, in the 22 kHz system, the bandwidth is about 18% of the frequency and each coded element is six carrier cycles but, due to clipping, a sample is made every 1.5 carrier cycles. Bandwidth may be increased to obtain more information but at the expense of reduced range due to a corresponding increase in the noise.

A digital signal processor (DSP) 230, which is preferably a 16-bit Texas Instruments TMS320E15, accumulates the sequences. The DSP 230 forms cross-correlations of sequences received from the eight receivers into two or more $8 \times 8$ matrices, i.e., one correlation coefficient per receiver transducer pair, at each of the time lags, typically 0 and $\tau_c$.

A timing generator 232 controls a power amplifier 226 to generate the appropriate coded pulse, which is generated into the water via the transmitting transducers 208. The electronics assembly 204 is powered by a power supply 236 which is regulated by a power regulator 234. The preferred correlation sonar system 200 requires less than 100 Watts of power.

The operation of certain other functional blocks, primarily the demodulators 222, the DSP 230 and the timing generator 232, in the electronics assembly 204 is coordinated by a microcomputer or CPU 228, which is preferably a CMOS 68000 microprocessor available from a number of vendors including Motorola. The host computer 214 communicates with the electronics assembly CPU 228 across a line 238, presently an RS-232 serial communications line, via an I/O port 240. The I/O port, or serial I/O board 240 connects to a computer or PC 242. It is also possible to replace the CPU 228 with an interface card for the electronics assembly. This interface card is then connected via a cable to a PC interface board located in the host computer 214. Communication between the host computer 214 and various electronics modules (e.g., DSP 230, timing generator 232, demodulators 222) is then possible without the use of a CPU card 228. The computer 242 also includes a secondary data storage media 244, preferably either a 100 Megabyte hard disk drive, a 44 Megabyte Bernoulli box or an optical disk. The computer 242 preferably includes a floating point processor and is presently configured with a Number Smasher-860 board, available from Microway of Kingston, Mass., which includes an Intel i860 64-bit, RISC architecture, microprocessor.

The computer 214 provides a convenient interface between the user and the correlation sonar system 200 by controlling various aspects of transmit, receive, storage, and analysis of data. The computer 214 allows the user to select a transmit pulse from a series of coded sequences stored on the data storage-device 244, as well as define the length of the receive signal to sample. The received signal is then divided into range gated bins wherein each bin contains a water velocity which has been estimated by maximum likelihood signal processing which is described below.

III. MAXIMUM LIKELIHOOD SIGNAL PROCESSING

Subsequent to the transmission of a phase modulated pulse, each of the receivers 210 (FIG. 10) record inbound pressure waves (complex values of voltage) as a function of time. The data is divided into bins wherein each bin is used to calculate a velocity estimate. The method outlined in this section is considered to be excellent at estimating the velocity; however, it is very computationally demanding.

In all the analysis presented here it is assumed that the incoming pressure is a complex Gaussian random variable as a function of time. This is justified because of the coupling between the central limit theorem and the large number of randomly placed scattering centers in the range bin of which the water velocity is being estimated. The general expression for the probability density function (PDF) of observing the data vector z given the parameters were in the state, $\theta$ for n complex data points is $$p(z;\theta) = \frac{1}{\pi^n} \frac{1}{|R|} \exp(-z^+ R^{-1} z), \quad (1)$$

where R is the $n \times n$ correlation matrix describing how data point $z_i$ is correlated with data point $z_j$, $|R|$ is the determinant of R, and $p(z;\theta)$ is the probability of obtaining z given that the parameters were in state $\theta$. With a priori assumptions concerning the probability distribution for the parameters, the most likely set of parameters can be obtained through solving for $\theta$ in $$\frac{\partial p(\theta;z)}{\partial \theta_i} = 0 = \frac{\partial p(z;\theta)}{\partial \theta_i}, \quad (2)$$

where $P(\theta;z)$ is the probability that the parameters were in state $\theta$ given the data was observed to be z.

A closed form analytical expression for the form of the cross-correlation function for water column returns enables the model correlation matrix, R, to be computed as a function of the unknown parameters (including velocity). This R matrix may then be used along with the data correlation matrix, $z_i z_j^+$, to form the probability function. The values of the unknown parameters may then be varied in an iterative search for the maximum of the probability function, which is equivalent to solving the set of simultaneous equations represented by equation (2). The expansion involves infinite sums over half-integer spherical Bessel functions and Legendre polynomials. In practice the sums may be truncated after several terms to obtain an adequate approximation.

To simplify the calculation, the natural logarithm is applied to equation (1) and, as a minimum is desired, the equation is multiplied by $-1$ so that the function of unknown parameters, g, becomes, $$g(V_x, V_y, V_z, SNR_{\tau=0}, SNR_{\tau=\tau_c}, \alpha, \beta, W, a) = -\ln p(z;\theta) = \quad (3)$$

$$-\ln \frac{1}{\pi^n} + \ln|R_{model}| + \text{Trace}(R_{data} R_{model}^{-1})$$

The first term can be ignored in the calculation as it is an offset curve. In one presently preferred system 200, the set of unknown parameters are as follows:

$v_x$ = the water velocity along the x-axis;
$v_y$ = the water velocity along the y-axis;
$v_z$ = the water velocity along the z-axis;
$SNR_{\tau=0}$ = the signal-to-noise ratio at lag $\tau=0$;
$SNR_{\tau=\tau_c}$ = the signal-to-noise ratio at lag $\tau=\tau_c$;
$\alpha$ = effective relative angle of the azimuth (FIG. 5);
$\beta$ = effective relative seabed tilt from the vertical;
W = width parameter of angular scattering function; and
a = wing parameter of angular scattering function.

Thus, in the maximum likelihood method, the unknown parameters are varied to minimize the function, g, and thereby maximize the probability of observing the received data in a specified parameter state.

IV. MODEL CORRELATION MATRIX

The model correlation matrix $R_{model}$, or just R in this section, can be calculated using a closed form expression for the spacial correlation function R. As water volume returns and bottom returns require somewhat different processing due to seabed tilt and seabed roughness issues, the following discussion presents an expression for the spacial correlation function used with water volume returns followed by several expressions for the spatial correlation function used with bottom returns. The expressions used with bottom returns differ as follows: the first expression assumes the seabed exhibits a Lambertian scattering function, i.e., $\cos(\theta)$; the second expression assumes the seabed exhibits a Kirchhoff approximation scattering function, i.e., $\sigma(\theta)$; and the third expression is a heuristic which much simplifies the calculations for R.

In the presently preferred embodiment, the structure of R is determined in the following way. The inbound pressure data points in time are numbered 1-8 for data at time $t=0$ for receivers 1-8, respectively, and 9-16 for data at time $t=\tau_c$ for receivers 1-8, respectively; then 17-24 for data at time $t=\Delta t$ (where $\Delta t$ is the sample interval) and 25-32 for data at time $t=\tau_c+\Delta t$, again for receivers 1-8, respectively, and so forth. A very large correlation matrix of size 8 m $\times$ 8 m is then generated for a system comprising 8 receivers and collecting "m" data points in time at a sampling interval of $\Delta t$. The value for "m" depends on a variety of factors which may include altitude, water profiling bin resolution, and number of code elements transmitted. For simplicity, it will be assumed that the sampling interval $\Delta t$ is commensurate with the system bandwidth so that each sample in time is independent. It is then easily seen that the 8 m $\times$ 8 m large matrix is really a block diagonal matrix with 16 $\times$ 16 submatricies down the main diagonal and zeros elsewhere. That is, data points 1-8 are correlated among themselves (spatial correlation function at 0 timeshift) and they are correlated with entries 9-16 (spatial correlation function at $\tau_c$ timeshift) but they are uncorrelated with all other data points. Likewise, entries 17-32 constitute a 16 $\times$ 16 submatrix, and so forth. Because the monopulse approach typically ensonifies all the scatterers in the beam pattern simultaneously, the nature of each 16×16 submatrix along the main diagonal is the same, i.e., each 16×16 submatrix along the main diagonal of the large 8 m×8 m matrix represents the spatial correlation function evolving in time. However, an advantage of the beam filled monopulse method is that the spatial correlation function becomes stationary, i.e., not a function of time. Thus, only an individual 16×16 submatrix need be considered for R. The spatial correlation function at zero time shift is contained in the upper left 8×8 and lower right 8×8 portion of R. The spatial correlation function at $\tau_c$ time shift is contained in the upper right 8×8 and lower left 8×8 portion of R. R is of course, Hermitian.

As is well-known in the transducer technology, the beam pattern, $W(\theta)$, where $\theta$ is the angle of measured energy away from the axis of wave propagation, can be represented as a finite series of Legendre polynomials with coefficients $b_n$, which thus allows the spacial correlation function to be a function of sum of integrals which involve the $n^{th}$ term of the beam pattern. (One description of Legendre polynomials is provided in *Mathematical Methods for Physicists* by George Arfen, Academic Press, New York, pp. 534–608.) Calling each of these integrals $R_n$, $$R_n = e^{i\psi}\left\{\left[\frac{2\pi}{\delta}\right]^{1/2} (1/2 + n)i^{-n}J_{1/2+n}(\delta)P_n(\cos\epsilon)\frac{1}{2n+1} + \left[\frac{2\pi}{\delta}\right]^{1/2} \sum_{\substack{k=1\\odd}}^{\infty} (1/2 + k)i^{-k}J_{1/2+k}(\delta) \times \right.$$

$$P_k(\cos\epsilon)(-1)^{(n+k-1)/2}\frac{(n-1)!!k!!}{n!!(k-1)!![k(k+1) - n(n+1)]} \text{ if } n \text{ is even } \left[\frac{2\pi}{\delta}\right]^{1/2} \sum_{\substack{k=0\\even}}^{\infty} (1/2 + k)i^{-k}J_{1/2+k}(\delta) \times$$

$$\left. P_k(\cos\epsilon)(-1)^{(n+k-1)/2}\frac{(k-1)!!n!!}{k!!(n-1)!![n(n+1) - k(k+1)]} \text{ if } n \text{ is odd } \right\}$$

where $$\delta = k[(2\tau v_z + a_6 - a_3)^2 + (2\tau v_x + a_4 - a_1)^2 + (2\tau v_y + a_5 - a_2)^2]^{1/2} \quad (9)$$

$$\cos\epsilon = \frac{2\tau v_z}{(\delta/k)} \quad (10)$$

$$R_n = e^{i\psi}\left[\frac{2\pi}{\delta}\right]^{1/2} \sum_{k=0}^{\infty} (1/2 + k) i^{-k}J_{1/2+k}(\delta) P_k(\cos\epsilon) \times$$

$$\int_0^{\pi/2} d\theta \sin\theta \, P_n(\cos\theta) P_k(\cos\theta)$$

where J is a Bessel function and P is a Legendre polynomial. Thus, the spacial correlation function is the sum of integrals as follows:

$$R = \sum_{n=0}^{R_{max}} b_n R_n \quad (5)$$

where each $b_n$ is a Legendre polynomial coefficient, and where $\psi=k[v_x(a_4-a_1)+v_x(a_5-a_2)+v_z(a_6-a_3)]/c$
$k=2\pi/\lambda$
$c$=speed of sound in water
$\lambda$=wavelength of the propogated sound wave
and further where the first and second receivers are located in the sensor frame at $(A_1,A_2,0)$ and $(A_4,A_5,0)$ respectively. Because the sensor can change attitude between the time of transmission and the time of reception, a rotation matrix must be applied to obtain the receiver locations appropriate in the coordinate system of the sensor at the time of transmission:

$a_4 - a_1 =$ $\cos\alpha \cdot \cos\beta \cdot [A_4 - A_1)\cos\gamma - (A_5 - A_2)\sin\gamma] -$ $\sin\alpha[(A_4 - A_1)\sin\gamma + (A_5 - A_2)\cos\gamma]$ $a_5 - a_2 =$ $\sin\alpha \cdot \cos\beta[(A_4 - A_1)\cos\gamma - (A_5 - A_2)\sin\gamma] +$ $\cos\alpha[(A_4 - A_1)\sin\gamma + (A_5 - A_2)\cos\gamma]$ $a_6 - a_3 = -\sin\beta[(A_4 - A_1)\cos\gamma - (A_5 - A_2)\sin\gamma]$
$\alpha = \tan^{-1}(-\sin\gamma \cdot \cos\beta/\cos\gamma)$ $$\delta = k[(2\tau v_z + a_6 - a_3)^2 + (2\tau v_x + a_4 - a_1)^2 + \quad (6)$$

$$(2\tau v_y + a_5 - a_2)^2]^{1/2}$$

$$\tan\epsilon = \frac{[(2\tau v_x + a_4 - a_1)^2 + (2\tau v_y + a_5 - a_2)^2]^{1/2}}{2\tau v_z + a_6 - a_3} \quad (7)$$

Unfortunately, the Legendre polynomials are orthogonal on the interval $(-\pi/2, \pi/2)$, and not the integration interval of $(0,\pi/2)$. However, after some further mathematical work on the equation it can be shown that the closed form expression for $R_n$ is as follows:

(8)

Depending on the parity of the beam pattern term being considered, i.e., n is even or odd, only one of the sums in equation (8) is to be used. $\delta$ is the total distance away from the bistatic point in all three dimensions and $\epsilon$ is a phase angle describing the relative contribution of vertical and horizontal displacement. In practice, the sums in equation (8) may be truncated after a few terms to obtain an adequate approximation to $R_n$. Equation (5) is then used to sum over the coefficients of the beam pattern to obtain the final, total correlation value.

A spacial correlation function to model bottom returns coming from a seabed is also important, however such a function should incorporate the existence of a tilted seabed as, for example, shown in FIG. 5. A four variable closed form expression is provided below:

$$R = \frac{e^{i\psi}}{2 \sum_{i=0}^{L} b_i l_i^0 P_i(\cos\beta)} \times \quad (11)$$

$$\left[ (2\pi/r)^{1/2} \sum_{i=0}^{L} b_i \left[ P_i(\cos\beta) \sum_{j=0}^{\infty} i^{-j} l_{ij}^0 J_{j+1/2}(r) P_j(\cos\eta) + \right. \right.$$

-continued
$$2 \sum_{m=1}^{l} P_l^m(\cos\beta)(-1)^m \cos[m(\phi_0 - \alpha)] \sum_{j=m}^{m} i^{-j} I_{lj}^m J_{j+1/2}(r) P_j^m(\cos\eta) \Big]\Big]$$

where

Variable Significance $r$ $(2\pi/\lambda) \times$ the total three axis distance the lag is from the bistatic point $(2\tau v_x, 2\tau v_y, 2\tau v_z)$ $\tan\eta$ the ratio of the horizontal distance away from the bistatic point to the negative of the vertical lag away from the bistatic point (defined in the seabed frame)

$\beta$ the nadir tilt angle of the seabed $\phi_0 - \alpha$ the azimuthal angle corresponding to the ratio of distance away in the y lag to x lag indexed off of the azimuthal angle in which the seabed is tilted and where ring geometry coefficients are defined as:

$$I_{lj}^m = \qquad (12)$$
$$(1/2+j) \frac{(l-m)!(j-m)!}{(l+m)!(j+m)!} \int_{\theta_1}^{\theta_1} \sin\theta \cos\theta P_l^m(\cos\theta) P_j^m(\cos\theta) d\theta$$

In equation (12), it is assumed that the seabed scattering follows a Lambertian law (i.e., intensity is proportional to $\cos\theta$) and that the function includes the combined effect of a series of rings from $\theta_1$ to $\theta_2$. If the angular scattering law of the seabed is not $\cos\theta$, but $\sigma(\theta)$ instead, then $\sigma(\theta)$ must be substituted for $\cos\theta$ in equation (12). The expression of equation (11) may be too complicated for many real-time applications so a two variable approximation has been derived as follows:

$$R = \frac{(2\pi/r)^{1/2} e^{i\psi}}{2 \sum_{l=0}^{L} b_l I_{l0}^0} \times \left[ \sum_{l=0}^{L} b_l \sum_{j=0}^{\infty} i^{-j} I_{lj}^0 J_{j+1/2}(r) P_j(\cos\eta) \right] \quad (12.1)$$

Unfortunately, under certain seabed roughness conditions the scattering function may not follow a Lambertian law. This may be true if the scattering function of the seabed is strongly dependent on the angle of the beam, being strongest at small angles near nadir. Thus, some alternative to the Lambertian function may be required to more accurately predict acoustic scattering on a seabed.

The Kirchhoff approximation assumes that the seabed surface is slowly varying so that the radius of curvature is much greater than a wavelength. Some researchers, including Clay, C. S. and Medwin, H. 1977, *Acoustical Oceanography*, John Wiley and Sons Publishing, have noted that the Kirchhoff approximation works reasonably well under a variety of realistic situations provided the incident angles do not approach grazing angles. Fortunately, for almost any conceivable correlation sonar geometry, most of the sound is closer to normal incidence than grazing incidence.

The expression for the backscatter cross section per unit area per unit solid angle for the diffuse scatter field under the Kirchhoff approximation can be derived, (following the development by Jackson, et al. in "Application of the Composite Roughness Model to High-Frequency Bottom Backscattering", J. Acoust. Soc. Am. 79 (5), May 1986) and is defined as follows:

$$\sigma(\theta) = \frac{k^2 R_{f0}^2}{2\lambda^2 \cos^2\theta} \int_{-\infty}^{\infty} dx \int_{-\infty}^{\infty} dy \exp[2ik\sin(\theta)x] \times \exp[-2k^2\cos^2(\theta)D(r)] \quad (13)$$

where the structure function $D(r)$ is used instead of the correlation function and the structure function is defined as $D(r) = 2[B(0) - B(r)]$ where $B(r)$ is the spatial autocorrelation function of the seabed and $R_{f0}$ is a reflection coefficient.

Most data on bottom roughness are derived from bathymetry and have a resolution of 100 meters or larger. Two-dimensional roughness spectra with centimeter scale resolution have be measured by Akal, T. and Hovem, J., 1978, "Two-dimensional space series analysis for seafloor roughness," Marine Geotechnol. 3, 171–182. Others in the literature have provided one-dimensional roughness spectra with centimeter-scale resolution. The data from course and fine seabed roughness measurements agree in having power-law roughness spectra. Therefore, this model assumes that the two-dimensional seabed roughness statistics are Gaussian and isotropic with a spatial power spectrum of the form $$\Phi(k) = \beta k^\gamma \qquad (14)$$

where $k$ is a two-dimensional wave vector having a magnitude equal to the wavenumber, $k$, and $\beta$ and $\gamma$ parameters describe a particular power spectrum of the seabed. The $\beta$ and $\gamma$ used in equation (14) are different and should not be confused with the $\beta$ and $\gamma$ angles used earlier. The noted high resolution data has the following approximate range for $\gamma$: $3 < \gamma < 3.5$.

After relating the structure function to the spatial power spectrum and the substitution of $\alpha = (\gamma/2) - 1$ is made then where $$D(r) = C_k^2 r^{2\alpha} \qquad (15)$$

$$C_k^2 = \frac{2\pi\beta \, 2^{-2\alpha} \Gamma(2-\alpha)}{\alpha(1-\alpha)\Gamma(1+\alpha)} \qquad (15.1)$$

$$\alpha = (\gamma/2) - 1$$

and $\Gamma(x)$ is the gamma function, Again $\alpha$ here should not be confused with the $e$ angle used earlier. The final backscatter equation can be derived by incorporating the structure function given in equation (15) into equation (13) and simplifying to yield $$\sigma(\theta) = \frac{R_{f0}^2}{4\pi \sin^2(\theta)\cos^2(\theta)} \int_0^\infty du \, u \, J_0(u) \exp(-qu^{2\alpha}) \qquad (16)$$

where
$$q = 2^{(1-2\alpha)} k^{(2-2\alpha)} \cos^2(\theta) C_k^2 \sin^{-2\alpha}(\theta) \qquad (17)$$

Equations (16) and (17) can be numerically computed to yield the backscatter cross section per unit area per solid angle as a function of angle $\theta$.

Although the Kirchhoff approximation appears to provide an accurate estimate of scattering, in investigating the various scattering curves corresponding to different degrees of seabed roughness a heuristic for the spacial correlation function R was discovered. The heuristic is used as an alternative expression when there are certain real-time constraints in the processing. The heuristic is a general function for band shapes as can be found, for example, in Spectral Analysis by James Blackburn. The expression is as follows:

$$R = \frac{R_{peak}}{\{1 + (2^{a2} - 1)[2(X - X_0)/W]^2\}^{1/a2}} \quad (18)$$

where $X_0$ is the center of the curve, W is the width parameter defined as twice the distance from the center to the $\frac{1}{2}$ curve height point and a is a wing parameter specifying the extent of the curve wing. $R_{peak}$ is either initially set high to 0.9 or estimated from the amplitude pressure data of the seabed return relative to the noise floor and a is set to $\frac{1}{2}$. Note that if a is set to 0, the curve is a Gaussian, and if a is set to 1, the curve is a Lorentzian.

V. OPERATION OF THE CORRELATION SONAR

Figure 11B:
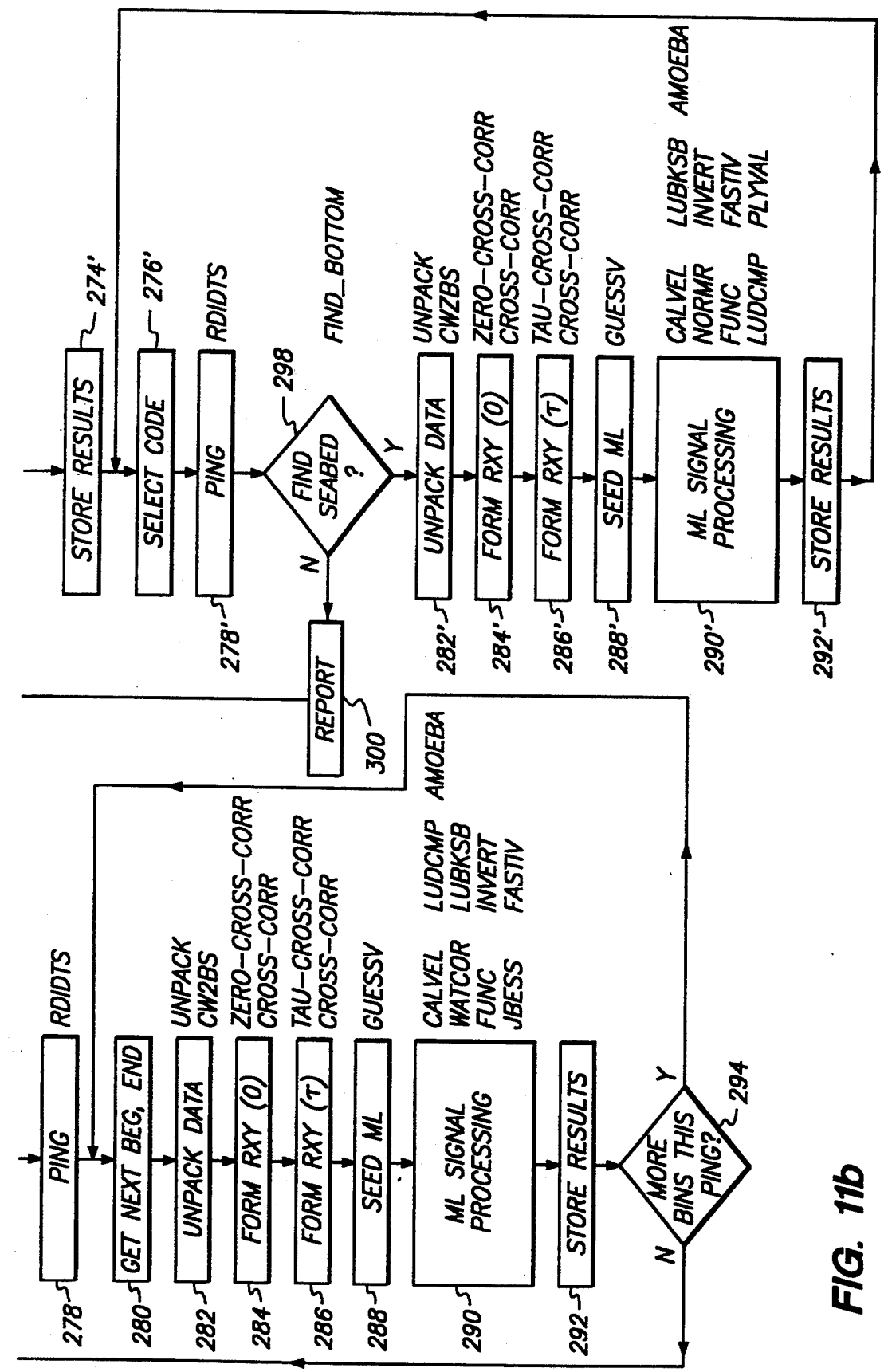
Figure 12B:
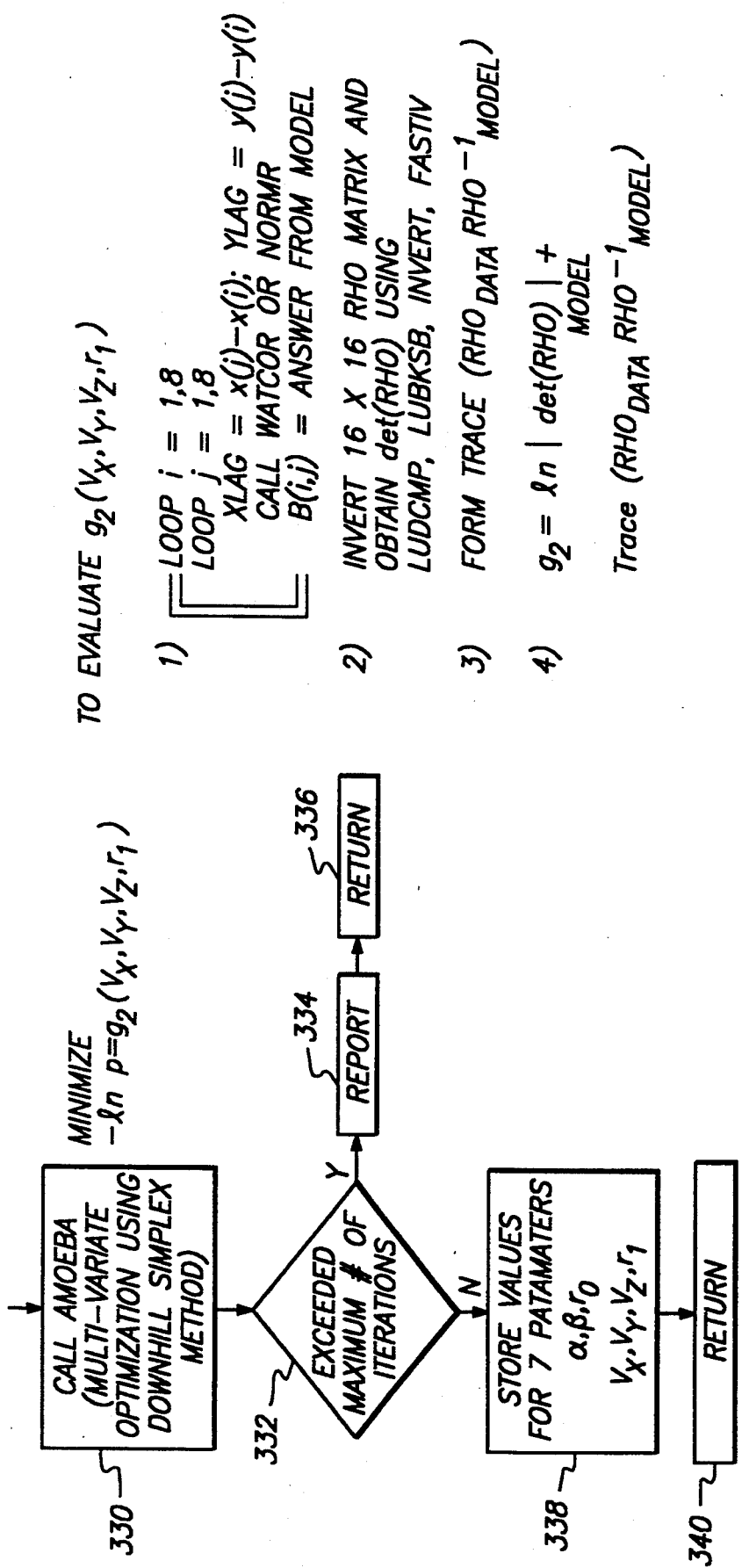

Maximum likelihood processing specific to the presently preferred acoustic correlation current profiler (correlation sonar) embodiment of the correlation sonar system is presented by general reference to FIGS. 11 and 12. In the Figures, function names used in the preferred software appear to the right of their corresponding state. Software for the present system is written in the FORTRAN language. The software described herein, particularly the portion listed in the attached Microfiche Appendix, was translated from source code to machine-readable object code using the NDP FORTRAN Version 4.0b compiler licensed from Microway. Nonetheless, one skilled in the technology will recognize that the steps in the accompanying flow diagrams can be implemented by using any of a number of different computer languages and language translators.

Now referring more specifically to FIG. 11, there is shown the correlation sonar software, generally indicated at 250, that is stored in the memory (not shown) of the host computer 214 (FIG. 10), and which controls signal generation and echo sampling, and conducts analysis of the sampled data to obtain velocity measurements. Beginning at power on, the correlation sonar enters a start state 252 and continues to state 254 to initialize the software by creating data structures and reading parameters from files on the disk 244, and at state 256 data is stored in registers to initialize the hardware.

At present, one of the software initialization parameters specified by the user is "bottom track mode". If the parameter is true a bottom track has been requested, and the execution flow proceeds down the right portion of the flow diagram; otherwise, a water profile has been requested, and the execution flow proceeds down the left portion of the flow diagram. Of course, one skilled in the technology will comprehend that the modes are for programming convenience and that the functionality of both modes could be combined so that bottom tracking and current profiling occur "together". In that way, the earth reference velocity of the water currents could be completely obtained within the correlation sonar 200 by subtracting the bottom tracking, or vessel, velocity from the current velocities.

As the right and left portions of the flow diagram in FIG. 11 overlap in most functions, only the left side will be discussed herein on a state-by-state basis. Thus, assuming that the user has specified measurements for a water profile, such as the example shown in FIG. 8, the correlation Sonar enters state 260 to select a specific code that is used to control the timing generator 232 (FIG. 232) and, hence, generate a coded pulse from the transmitter transducer 208.

The sequence data indicative of the echo signal is received from the demodulators 222 (FIG. 10) by the CPU 228, and forwarded to the host computer 214. The correlation sonar 200 then enters state 264 to unpack the sequence data. Specifically, the sine and cosine binary data for two receiver transducers 210 and 1 byte of amplitude data, sampled at a lesser rate, for each transducer 210 are all packed into the digital Sequence. Therefore, the different data and data from different sources is extracted at state 264. Proceeding to state 266, the cross-correlation matrix, R(0) for a time lag of 0 is created for all eight of the receiving transducers 210 (FIGS. 9 and 10), thus creating an 8×8 matrix, wherein each row and column corresponds to a receiving transducer. Subsequently, at state 268, the cross-correlation matrix, R($\tau$) for a time lag of $\tau_c$ is created as another 8×8 matrix. Then, a "seed" is generated for the maximum likelihood signal processing at state 270. Here, accuracy is not the consideration so much as providing an initial guess for the water velocity unknowns, $v_x$, $v_y$, and $v_z$. This is accomplished by using a 3×3 matched filter approach on the R($\tau$) matrix to average the contents of every nine neighborhood amplitude correlation coefficients. A first moment technique is then used and the results are divided by $2\tau$ to obtain an initial estimate of $v_x$ and $v_y$. The velocity $v_z$ could be set to zero. However, more preferably, the phase shift of the highest correlation coefficient can be used to estimate $v_z$.

Two transducer pairs, one up from the origin and one to the right of the origin, are used to index the R(0) matrix so as to estimate effective sensor tilt or seabed angles $\alpha$ and $\beta$. The phase shifts are indicative of the direction of sound propagation in two dimensions.

The initial $SNR_0$ estimate can be obtained from the amplitude pressure data relation to the noise floor, or it can be set to a high value, say 10, arbitrarily. The $SNR_\tau$ estimate can be determined by selecting the highest correlation coefficient from the R($\tau$) matrix and then using the following equation:

$$\frac{1}{magnitude(\rho)} = 1 + \frac{1}{SNR} \quad (19)$$

After setting the above-noted estimated parameters, the correlation sonar 200 enters state 272 to handle maximum likelihood (ML) signal processing. The inputs to state 272 can categorized into three groups, group one contains the following inputs: $\alpha$, $\beta$, $SNR_0$, $SNR_\tau$, $v_x$, $v_y$, and $v_z$, (w and a are also included for bottom tracking), which were calculated at state 270. Group two contains the changes in the group one parameters. Initially, these values are determined based upon reasonable guesses as, for example, shown in the Microfiche Appendix. Group three contains cross-correlation matrices R(0) and R($\tau$). The outputs of the ML state 272 are the new group one parameters. The ML processing is executed on the host computer 214 (FIG. 10) after either receiving the raw data and forming the correlation matrices or receiving the cross-correlation matrices directly from the DSP 230 of the electronics assembly 204. The function of state 272 will be discussed hereinbelow with reference to FIG. 12.

Figure 10:
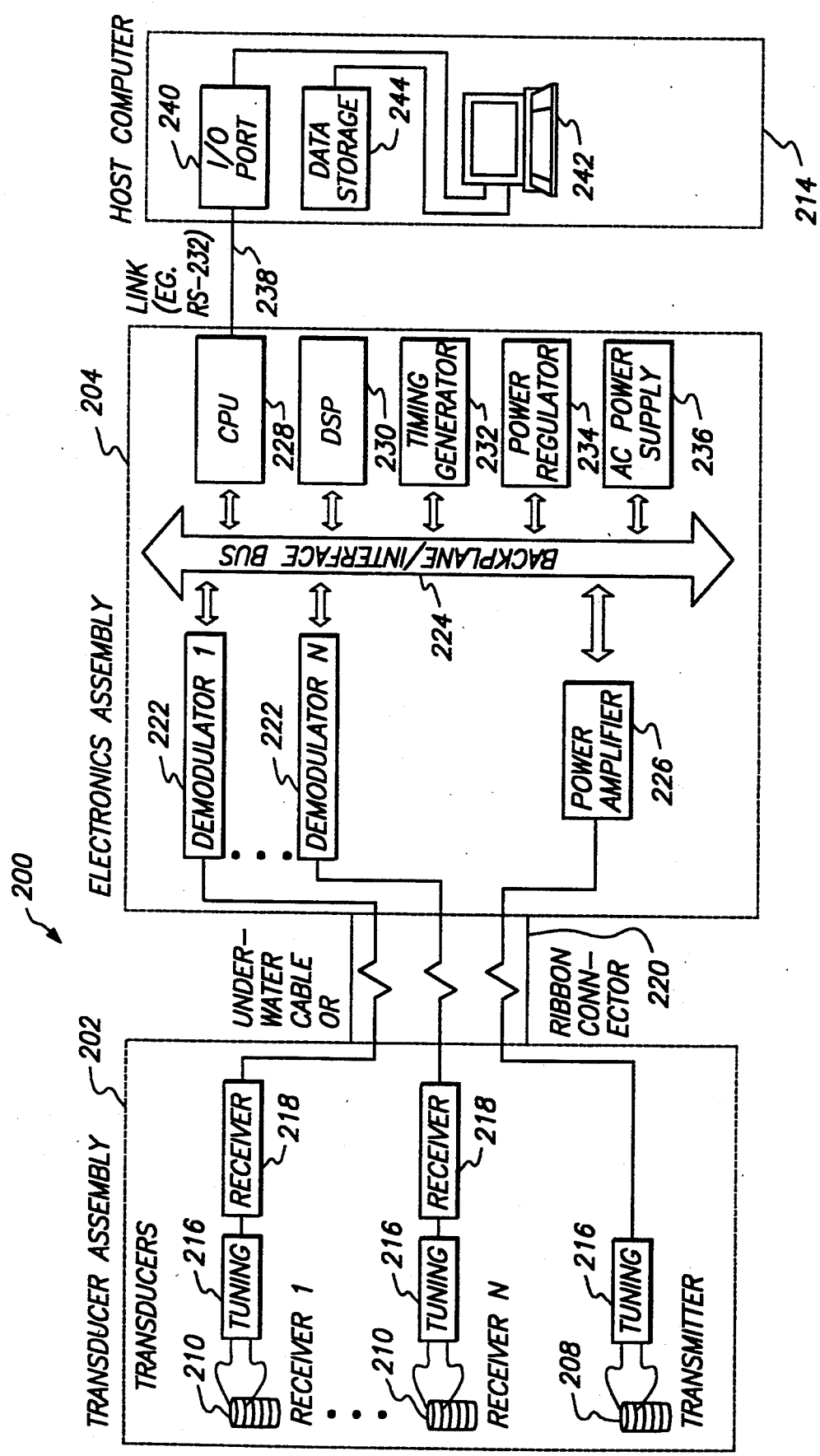
FIG. 10 is a block diagram of the correlation sonar system shown in FIGS. 9.

Continuing to refer to FIG. 11, after the completion of the ML signal processing (state 272) the correlation sonar 200 moves to state 274 to store the outputs: $\alpha$, $\beta$, $SNR_0$, $SNR_\tau$, $v_x$, $v_y$, and $v_z$, (and w and a for bottom tracking), to the data storage device 244 (FIG. 10). Also, $-\ln(P)$ is stored which is indicative of a goodness of fit. Then, at state 276 a coded pulse is selected, which is not necessarily the default code as was selected at state 260. In fact, the code is selected according to the relative measured velocity of the water and in the case of bottom tracking, the currently estimated altitude to the seabed.

The pseudorandom codes are selected primarily based on the length and correlation lag time. Length is important for the following two tracking criteria:

(i) for water tracking because it determines the spatial resolution of each water bin. Long codes will produce coarse resolution in the profiling of current velocity. They, however, have the advantage of depositing the most amount of energy into the water and permit maximum range. Shorter codes allow better resolution (up to a point where the beamwidth geometry begins to dominate the bin profile resolution), but they do not place as much energy into the water.

(ii) for bottom tracking the code length is chosen to be long enough to typically ensonify all the scatterers within the beam pattern on the seabed and allow sufficient time to perform the necessary cross-correlations.

Lag time, $\tau_c$, is important because the location of the peak is approximately given by $2\tau_c$ velocity. Thus, $\tau_c$ is chosen based on velocity such that the peak location will remain on the configured array of receivers, otherwise accuracy in the estimated velocity is compromised. However, if $\tau_c$ is selected to be too low, thereby virtually guaranteeing the peak is on the array for even high velocity, precision in the estimate tends to be lost. These two considerations must be constantly monitored and traded-off to arrive at a proper selection of lag time.

The ping for the selected code is generated at state 278 in the same manner as was described with respect to state 262. In receiving the echo signal for current profiling, the echo return signal is range gated (or, equivalently, time gated) by looping overt he states 280–294, wherein state 280 is a counter state for incrementing the bin, or cell, number. The bin number is calculated according to the length of the pulse and the velocity resolution specified by the user. The loop is finally exited at state 294 when a test of the bin counter indicates that all bins for this ping have been processed. It should be noted that preferably a weighing function based on depth is used to determine the number of profile bins. For example, the program DETPRO in the Microfiche Appendix will provide a weighted bin profile. Velocity measurements based on a new ping are initiated again at state 276, and they continue until the correlation sonar 200 is either reset or powered down.

Returning, in the discussion of FIG. 11, to the right portion of the flow diagram which relates to the bottom tracking mode of operation, most states have been labeled with the same number as the left portion (current profiling mode) followed by prime (') to indicate identical or similar functionality. However, states not shown in the left portion include states 296, 298 and 300. Specifically, state 296 is entered after an initial ping (state 262') to find the seabed. If the seabed is not found, a new code is selected and ping generated until it is found. This state is accomplished Using a matched filter approach which is a modified version of the process disclosed in the common assignee's previously cited patent. The loop from states 276'-292' is continuously executed unless the seabed is not found, e.g., the vessel passes over a canyon. In that case, the correlation sonar 200 moves from state 298 to state 300 to report the loss of tracking and a the bottom track initialization (states 260',262',296) is again carried out One presently preferred function for maximum likelihood (ML) signal processing is shown diagrammatically in FIG. 12. Note that parameters characterizing seabed roughness, e. g., the width parameter, W, and the wing parameter, a, both of which were discussed above, are not shown in FIG. 12, but could be readily incorporated therein by one who is skilled in the relevant technology.

Generally, the function uses a dual fit approach, namely, three parameters for water profiling or five parameters for bottom tracking are fit, then the remaining four parameters are fit. In particular, the effective tilt angles, $\alpha$ and $\beta$, and the signal-to-noise ratio at time lag 0, $SNR_0$ naturally reside in the lag 0 correlation space. Likewise, $SNR_\tau$, and the water velocities, $v_x$, $v_y$, and $v_z$, naturally reside in the lag $\tau$ correlation space.

The ML function, used in states 272,290,272',290' (FIG. 11), is entered by the correlation sonar 200 (FIG. 10) at start state 310. Whether the first or second parameter pass is being calculated depends on the FITFLG (fit flag) which is initially set to true at state 312 to indicate $\alpha$, $\beta$ and $SNR_0$ will be fit. As the multi-variate, non-linear programming optimization relies on the well-known simplex algorithm, a four (six for bottom tracking) vertex polyhedren is formed by evaluating the negative of the natural logarithm of the probability function, gx, at the model parameters and at each parameter varied by an offset as follows (brackets denote additional parameters required for bottom tracking):

$$g_1(\alpha_0,\beta_0,SNR_0, [w_0,a_0]) \quad (20.1)$$

$$g_1(\alpha_0+\Delta\alpha,\beta_0,SNR_0, [w_0,a_0]) \quad (20.2)$$

$$g_1(\alpha_0,\beta_0+\Delta\beta,SNR_0, [w_0,a_0]) \quad (20.3)$$

$$g_1(\alpha_0,\beta_0,SNR_0+\Delta SNR_0, [w_0,a_0]) \quad (20.4)$$

$$g_1(\alpha_0,\beta_0,SNR_0, [w_0+\Delta w_0,a_0]) \quad (20.5)$$

$$g_1(\alpha_0,\beta_0,SNR_0, [w_0,a_0+\Delta a_0]) \quad (20.6)$$

It is important to note that the offsets are estimated. If the offsets are too large, the simplex method, which iteratively moves along the edges of the polyhedron, may be misled into a local minimum instead of the desired global minimum. On the other hand, if the offsets are too small, the simplex method may take too long to complete because the starting point of the iteration is far from the global optimum and the incremental change at each iteration is so small.

The simplex method in the correlation sonar 200 is presently implemented in a FORTRAN subroutine named AMOEBA (since the method "oozes" down the edges of the tetrahedron). The subroutine is based on the simplex method given in "Numerical Recipes, The Art of Scientific Computing" by Press, Flannery, Teukolsky, and Vetterling, specifically described in Section 10.4 entitled "Downhill Simplex Method in Multidimensions"; Press Syndicate of the University of Cambridge. One of the parameters in the subroutine is ITER, the number of iterations to be performed by AMOEBA. At each iteration the unknown parameters $\alpha$, $\beta$, and $SNR_0$ (and $[w_0, a_0]$ for bottom tracking) are evaluated in $g_1$ as follows:

$$g_1 = \ln|det(A_{model})| + Trace(A_{data}A_{model}^{-1}) \quad (21)$$

where A is an $8 \times 8$ matrix equal in structure to $R(0)$. Thus, a user defined maximum number of iterations will prevent an endless iteration over the search space, and a test is made at state 318, to determine whether the maximum number of iterations was exceeded. If so, a report of the status is written to the video display of the host computer 214 (FIG. 10) and the ML process completes with incomplete results at state 322.

Otherwise, if the simplex method (state 316) did converge within the predetermined number of iterations, the presumed global optimum for the set of unknown parameters in the first gamma function, $g_1$, is stored to system memory at state 324. Then, the FITFLG is set to false, at state 326, to indicate that the second set of unknown parameters will be fit. In this instance, at state 328 the unknown parameters, $SNR_T$, $v_x$, $v_y$, and $v_z$ are fit according to the second gamma function, $g_2$, as follows:

$$g_2 = \ln|det(P_{model})| + Trace(P_{data}P_{model}^{-1}) \quad (22)$$

A five vertex simplex is created by evaluating $g_2$ at the five parameter sets defined by varying the offsets, similar to the method employed in state 314 described above. In calculating $g_2$, a $16 \times 16$ matrix, P (or RHO), is created wherein the matrix can be described as having four $8 \times 8$ complex submatrices. The upper left submatrix is $R(0)$, the upper right submatrix is $R(\tau)$, the lower left submatrix is the complex conjugate of $R(\tau)$, and the lower right submatrix is $R(0)$. This special matrix structure allows a fast matrix inversion as provided, for example, by FASTIV included in the Microfiche Appendix.

Again, the simplex method is applied to search a multi-variate parameter space, this time a five parameter space at state 330. If the maximum number of iterations are determined to have been exceeded at state 332, then a report is made (state 334) and the correlation sonar 200 exits the ML procedure at state 336. Alternatively, continuing from state 332 to state 338 a solution has been found and the control flow continues to return the seven (nine for bottom tracking) parameters in system memory. The ML process then returns control flow back to the correlation sonar top-level flow as shown diagrammatically in FIG. 11.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention.

What is claimed is:

1. A method of determining the relative velocity between a correlation sonar system and a reflective surface, comprising the steps of:
   providing a transmitting transducer for emitting acoustic energy onto the reflective surface;
   generating a single pulse of electrical energy to the transmitting transducer;
   providing a plurality of receiving transducers for receiving a single return echo pulse from the reflecting surface after transmission of the single pulse from the transmitting transducer;
   providing a plurality of demodulators, wherein each one of the demodulators is connected to a corresponding one of the receiving transducers, and wherein each of the demodulators generates a set of values;
   cross-correlating the set of values for each receiving transducer at a predetermined time lag less than the width of the single return echo pulse; and
   estimating the relative velocity between the sonar system and the reflective surface using the cross-correlated set of values.

2. The method of claim 1, wherein the single pulse comprises a plurality of coded elements.

3. The method of claim 2, wherein each coded element comprises a plurality of carrier cycles.

4. The method of claim 1, wherein the set of values are complex number values representative of the single return echo pulse.

5. The method of claim 2, additionally comprising the step of phase-encoding the coded elements.

6. The method of claim 5, wherein the coded elements are coded so as to provide zeroes on either side of a preselected autocorrelation peak lag, thereby reducing the corruption of velocity estimates caused by autocorrelation side-lobe biases.

7. The method of claim 1, additionally comprising the step of separating the receiving transducers by a distance of the same order of magnitude of the wavelength in the single return echo pulse.

8. In a computer, a method for generating an optimized coded monopulse signal comprising a plurality of coded pulse elements to improve noise averaging, comprising the steps of:
   specifying a length for a coded monopulse signal;
   specifying a time lag for an autocorrelation peak of the autocorrelation function corresponding to the coded monopulse signal;
   generating an initial pseudo-random code of the specified length using a code-finding program in the computer, said code indicative of the coded monopulse signal;
   calculating an autocorrelation function for the initial pseudo-random code having the specified time lag;
   calculating a current best figure of merit based upon the autocorrelation function; and
   searching among a plurality of candidate codes, each one of said codes having a calculable figure of merit, for a best coded monopulse signal, said search beginning with the initial pseudo-random code and being responsive to the current best and calculable figures of merit.

9. The method of claim 8, wherein the searching step comprises successively repeating the following steps:
   randomly mutating one of the codes to produce a mutated code, said mutated code being one of the plurality of candidate codes;
   calculating an autocorrelation function for the mutated code having the specified time lag;
   calculating a new figure of merit based upon the autocorrelation function of the mutated code;
   comparing the new figure of merit to the current best figure of merit; and selecting and storing the current best figure of merit and corresponding current best coded monopulse signal resulting from the comparison.

10. The method of claim 9, wherein only selected code elements in the coded monopulse signal are mutated, and additionally comprising the step of allowing the number of code elements per mutation to vary so that focused searching is conducted in the neighborhood around the current best coded monopulse signal.

11. The method of claim 10, additionally comprising the step of incrementally increasing the number of code elements changed per mutation so as to more rapidly expand the neighborhood of the search.

12. The method of claim 8, additionally comprising the steps of:
performing repeated searches, wherein each of the searches begins with a new initial pseudo-random code;
comparing the figures of merit for the current best coded monopulse signal resulting from each search and a previous best coded monopulse signal; and
storing the current best coded monopulse signal as the very best coded monopulse signal based upon the comparison.

13. The method of claim 8, additionally comprising the step of encoding the coded monopulse signal using phase encoding.

14. The method of claim 13, further comprising the step of modulating a carrier phase to be one of 0 degrees or 180 degrees for each element of the coded monopulse sequence.

15. The method of claim 14, further comprising the step of mutating the coded elements to provide zeroes on either side of a preselected auto-correlation peak lag, thereby reducing the corruption of velocity estimates caused by autocorrelation sidelobe biases.

16. The method of claim 2, additionally comprising the steps of:
specifying a length for the single pulse;
specifying a time lag for an autocorrelation peak of the autocorrelation function corresponding to the single pulse;
generating an initial pseudo-random code of the specified length using a code-finding program in a computer;
calculating an autocorrelation function for the initial pseudo-random code having the specified time lag;
calculating a current best figure of merit based upon the autocorrelation function; and
searching among a plurality of candidate codes, each one of said codes having a calculable figure of merit, for a selected code indicative of the single pulse, said search beginning with the initial pseudo-random code and being responsive to the current best and calculable figures of merit.

17. The method of claim 1, wherein the cross-correlating step is conducted for the time lag equal to zero and for the time lag equal to tau.

* * * * *

UNITED STATES PATENT AND TRADEMARK OFFICE
CERTIFICATE OF CORRECTION

PATENT NO. : 5,422,860  
DATED : June 6, 1995  
INVENTOR(S) : Bradley, Steven E. and Rowe, Francis D.

It is certified that error appears in the above-identified patent and that said Letters Patent is hereby corrected as shown below:

Column 1,  
Line 17, before "BACKGROUND OF THE INVENTION" please add the following paragraph and heading -- "Governmental Rights This invention was made with Government support under Contract Number N00014-92-C-0054 awarded by The Office of Naval Research. The Government has certain rights in this invention." --

Signed and Sealed this

Twenty-fifth Day of February, 2003

JAMES E. ROGAN  
*Director of the United States Patent and Trademark Office*